United States Patent
Fukuhara et al.

(10) Patent No.: US 9,686,754 B2
(45) Date of Patent: Jun. 20, 2017

(54) WIRELESS COMMUNICATION APPARATUS FOR IN-VEHICLE TRANSMISSION POWER CONTROL

(71) Applicants: Hideki Fukuhara, Tokyo (JP); Takeshi Mitsui, Tokyo (JP); Yoshihiro Nakai, Kobe (JP); Hiroyuki Yokota, Kobe (JP)

(72) Inventors: Hideki Fukuhara, Tokyo (JP); Takeshi Mitsui, Tokyo (JP); Yoshihiro Nakai, Kobe (JP); Hiroyuki Yokota, Kobe (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 166 days.

(21) Appl. No.: 14/423,355

(22) PCT Filed: Oct. 5, 2012

(86) PCT No.: PCT/JP2012/075989
§ 371 (c)(1),
(2) Date: Feb. 23, 2015

(87) PCT Pub. No.: WO2014/054170
PCT Pub. Date: Apr. 10, 2014

(65) Prior Publication Data
US 2015/0208364 A1 Jul. 23, 2015

(51) Int. Cl.
*H04W 52/28* (2009.01)
*H04W 4/04* (2009.01)
(Continued)

(52) U.S. Cl.
CPC .............. *H04W 52/28* (2013.01); *H04L 67/12* (2013.01); *H04W 4/046* (2013.01);
(Continued)

(58) Field of Classification Search
CPC .... H04L 67/12; H04W 4/046; H04W 52/243; H04W 52/245; H04W 52/28;
(Continued)

(56) References Cited

U.S. PATENT DOCUMENTS 6,724,808 B1 * 4/2004 Ohshima .............. H04B 1/7115
375/147
7,702,312 B2 * 4/2010 Bollmann ........... H04M 1/6091
235/380

(Continued)

FOREIGN PATENT DOCUMENTS

JE 2006-128748 A 5/2006
JE 2007-232592 A 9/2007
(Continued)

OTHER PUBLICATIONS

Kim, J., "Interference-aware Transmission Power Control for Wireless Sensor Networks," IEICE Trans. Commun. E91-B:11:1-8 (Nov. 2008).

*Primary Examiner* — Devan Sandiford
(74) *Attorney, Agent, or Firm* — Birch, Stewart, Kolasch & Birch, LLP

(57) ABSTRACT

An onboard wireless communication apparatus 10 includes an in-vehicle informing processor that transmits information that enables a wireless set 20 to recognize that it is located inside a vehicle 100 to the wireless set 20 which is about to carry out wireless communication with a first wireless communication apparatus 11a serving as a communication partner, and which controls, when the wireless set 20 recognizes that it is located inside the vehicle 100, its transmit power in a manner preventing an excessive receiving power level of a second communication apparatus 11b that is carrying out, besides the first wireless communication apparatus 11a, wireless communication inside the vehicle 100 by (Continued)

a wireless communication technique using the same frequency band as the first wireless communication apparatus 11*a*.

10 Claims, 11 Drawing Sheets

(51) Int. Cl.
*H04W 52/24* (2009.01)
*H04W 52/38* (2009.01)
*H04W 72/04* (2009.01)
*H04W 76/02* (2009.01)
*H04L 29/08* (2006.01)
*H04W 84/12* (2009.01)

(52) U.S. Cl.
CPC ....... *H04W 52/243* (2013.01); *H04W 52/245* (2013.01); *H04W 52/383* (2013.01); *H04W 72/0453* (2013.01); *H04W 76/021* (2013.01); *H04W 84/12* (2013.01)

(58) Field of Classification Search
CPC ........... H04W 52/383; H04W 72/0453; H04W 76/021; H04W 84/12
See application file for complete search history.

(56) References Cited

U.S. PATENT DOCUMENTS

| | | | | |
|---|---|---|---|---|
| 7,742,792 | B2* | 6/2010 | Matsui | H04M 1/6091 455/569.2 |
| 8,694,047 | B2* | 4/2014 | Yang | G06F 1/266 370/252 |
| 8,996,056 | B2* | 3/2015 | Yamamoto | H04W 16/08 370/310 |
| 2001/0021640 | A1* | 9/2001 | Lappe | H04B 1/3822 455/41.2 |
| 2006/0188004 | A1* | 8/2006 | Kizu | H04B 1/715 375/132 |
| 2008/0056177 | A1 | 3/2008 | Mori et al. | |
| 2009/0176454 | A1* | 7/2009 | Chen | H04W 16/14 455/63.1 |
| 2009/0232236 | A1* | 9/2009 | Yamamoto | H04W 56/0005 375/260 |
| 2009/0291641 | A1 | 11/2009 | Sato et al. | |
| 2010/0049819 | A1* | 2/2010 | Hamada | G08G 1/161 709/207 |
| 2010/0234071 | A1* | 9/2010 | Shabtay | H04B 7/0408 455/562.1 |
| 2011/0007675 | A1* | 1/2011 | Chiou | H04B 1/406 370/297 |
| 2011/0009060 | A1* | 1/2011 | Hsu | H04W 52/16 455/41.2 |
| 2011/0053523 | A1* | 3/2011 | Yeh | H04B 1/406 455/73 |
| 2011/0111764 | A1* | 5/2011 | Mueck | H04M 1/725 455/452.1 |
| 2012/0214463 | A1* | 8/2012 | Smith | H04M 1/72577 455/418 |
| 2013/0156012 | A1* | 6/2013 | Raskin | H04W 52/146 370/336 |
| 2013/0190025 | A1* | 7/2013 | Sakata | H04W 52/243 455/501 |
| 2013/0237245 | A1* | 9/2013 | Tinnakornsrisuphap | H04W 64/00 455/456.1 |
| 2013/0267182 | A1* | 10/2013 | Brandt | H03G 3/3042 455/73 |
| 2013/0324051 | A1* | 12/2013 | Magarida | H04B 17/00 455/67.12 |
| 2014/0112320 | A1* | 4/2014 | Makhlouf | H04W 72/02 370/338 |
| 2014/0226502 | A1* | 8/2014 | Behnamfar | H04L 1/00 370/252 |
| 2015/0257110 | A1* | 9/2015 | Chen | H04W 52/241 375/259 |
| 2015/0257158 | A1* | 9/2015 | Jadhav | H04B 1/04 455/404.1 |
| 2016/0198310 | A1* | 7/2016 | Chalmers | H04W 4/046 455/456.1 |

FOREIGN PATENT DOCUMENTS

| | | |
|---|---|---|
| JP | 2002-271252 A | 9/2002 |
| JP | 2003318809 A * | 11/2003 |
| JP | 2007-243765 A | 9/2007 |
| JP | 2008-060994 A | 3/2008 |
| JP | 2008-172556 A | 7/2008 |
| JP | 2009-281927 A | 12/2009 |
| JP | 2010-233187 A | 10/2010 |
| JP | 2010-278764 A | 12/2010 |
| JP | 2011-176874 A | 9/2011 |
| JP | 2012-186666 A | 9/2012 |
| WO | WO 2008/034029 A2 | 3/2008 |
| WO | WO 2010/090567 A1 | 8/2010 |
| WO | WO 2010/105210 A2 | 9/2010 |

* cited by examiner

WIRELESS COMMUNICATION APPARATUS FOR IN-VEHICLE TRANSMISSION POWER CONTROL

TECHNICAL FIELD

The present invention relates to an onboard wireless communication apparatus and a wireless set that carry out wireless communication using the same frequency band.

BACKGROUND ART

When wireless communication apparatuses that carry out wireless communication by a plurality of wireless communication techniques using neighboring frequencies coexist inside a vehicle or the like, communication interference, that is, radio waves the wireless communication apparatuses use become noise to each other, thereby deteriorating communication quality.

In particular, both a wireless LAN (Local Area Network) and Bluetooth (registered trademark: not referred to from now on) utilize 2.4 GHz band frequency as their frequency channels. Accordingly, the communication interference mentioned above are likely to occur.

A wireless communication apparatus described in a Patent Document 1 comprises wireless communication units with different wireless communication techniques using the same frequency band such as a wireless LAN and Bluetooth. The wireless communication apparatus assigns a use frequency channel to each wireless communication unit in such a manner that the channels do not overlap, thereby reducing communication interference to each other.

In addition, a Patent Document 2 discloses a wireless communication apparatus that appropriately detects or avoids communication interference according to statistical information about a communication state of an actual wireless LAN.

On the other hand, a mobile station described in a Patent Document 3 has a function of deciding on whether it is located indoors or outdoors. For example, it decides on whether the mobile station is located indoors or outdoors according to the distance covered by the mobile station estimated from the received power of the positioning signal transmitted from GPS (Global Positioning System) satellites and from position information contained in the positioning signal. Furthermore, the mobile station of the Patent Document 3 makes a similar decision according to position information and map information from base stations of a mobile phone network.

PRIOR ART DOCUMENT

Patent Document

Patent Document 1: Japanese Patent Laid-Open No. 2010-278764.
Patent Document 2: Japanese Patent Laid-Open No. 2010-233187.
Patent Document 3: Japanese Patent Laid-Open No. 2009-281927.

DISCLOSURE OF THE INVENTION

Problems to be Solved by the Invention

In a small closed space surrounded by a metal such as inside a vehicle, since radio diffusion outside the vehicle is suppressed, a radio propagation loss is small, and the received power level does not fall below a certain value even at a position some distance separate from a transmitting antenna. In this state, if the received power level becomes too high, and the receiving operation is carried out in a nonlinear region, the received signal deteriorates and is likely to fall into an unreceivable state. Such a fault due to the excessive received power level cannot be eliminated by only controlling the assignment of the use frequency channels as the conventional technique represented by the Patent Document 1.

In addition, as for the conventional technique represented by the Patent Document 2, since it requires the statistical information about the communication state to detect or avoid the communication interference, it must continue the wireless LAN communication for a long time period that will enable obtaining the statistical information. Accordingly, it has a problem of being affected by the communication interference during the time period of collecting the statistical information. In addition, the Patent Document 2 supposes only a wireless LAN without considering Bluetooth using the same frequency band.

It is conceivable as the Patent Document 3 to decide the position of the wireless communication apparatus, and to work out countermeasure against the communication interference in accordance with the position of the decision result.

However, since the technique described in the Patent Document 3 decides only on whether the mobile station is located indoors or outdoors to the end, it cannot decide on whether the inside of the vehicle belongs to the inside or outside.

The present invention is implemented to solve the foregoing problems. Therefore it is an object of the present invention to provide an onboard wireless communication apparatus and a wireless set capable of improving the communication quality by reducing the deterioration of the receiving performance due to the excessive received power level in the in-vehicle space.

Means for Solving the Problems

An onboard wireless communication apparatus in accordance with the present invention, which is installed inside a vehicle and includes a first wireless communication apparatus that carries out wireless communication, the onboard wireless communication apparatus comprising: an in-vehicle informing processor that sends information that enables a wireless set to recognize that the wireless set is located inside the vehicle to the wireless set which is about to carry out wireless communication with the first wireless communication apparatus serving as a communication partner, and which controls, when the wireless set recognizes that it is located inside the vehicle, its transmit power in a manner avoiding an excessive receiving power level of a second communication apparatus that is carrying out, besides the first wireless communication apparatus, wireless communication inside the vehicle by a wireless communication technique using the same frequency band as the first wireless communication apparatus.

Advantages of the Invention

According to the invention, it offers an advantage of being able to improve the communication quality by reducing the deterioration of the receiving performance due to the excessive received power level in the in-vehicle space.

BEST MODE FOR CARRYING OUT THE INVENTION

The best mode for carrying out the invention will now be described with reference to the accompanying drawings to explain the present invention in more detail.
Embodiment 1

Figure 1:
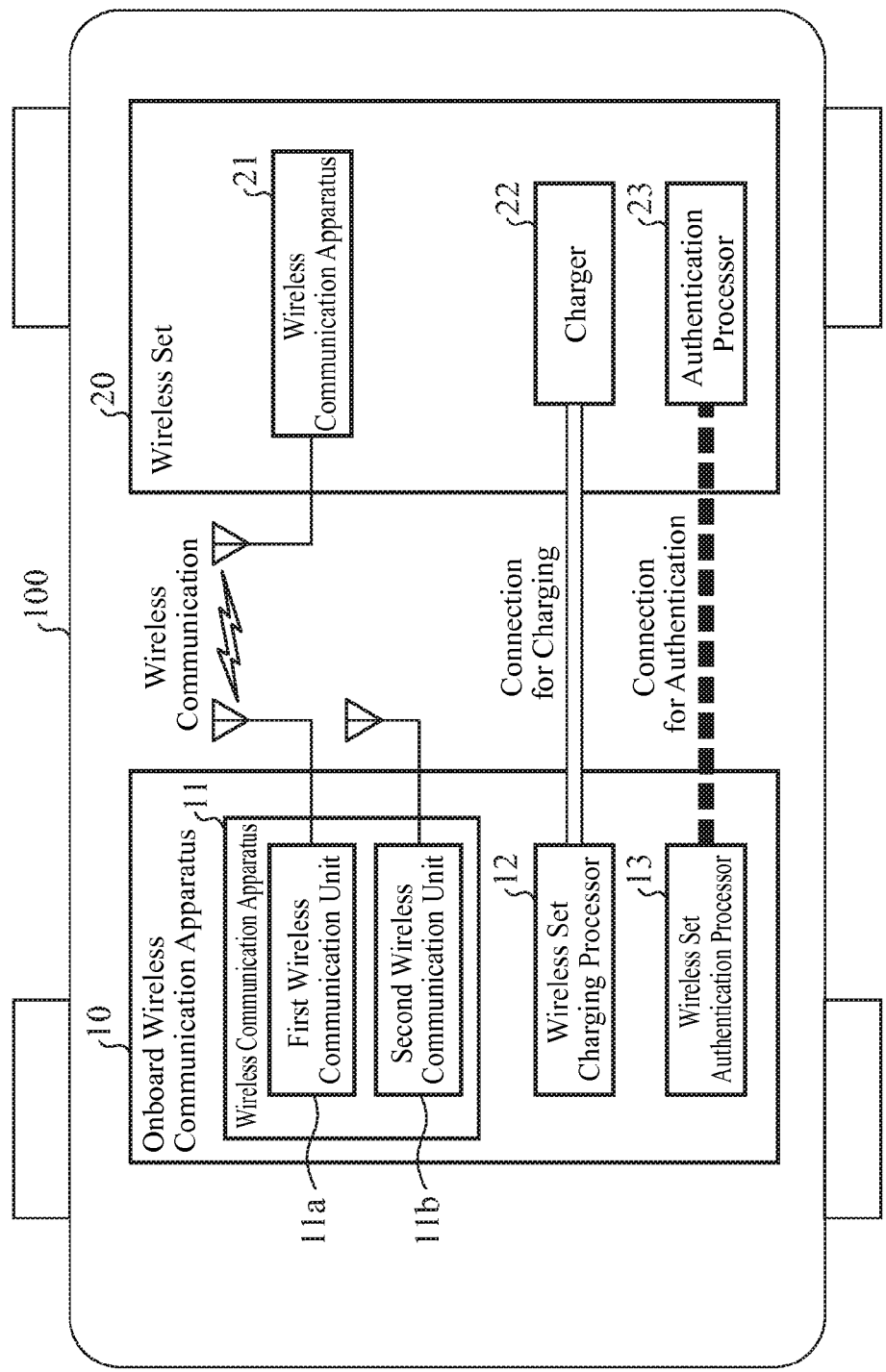
FIG. 1 is a diagram showing an onboard wireless communication apparatus and a wireless set of an embodiment 1 in accordance with the present invention.

FIG. 1 is a diagram showing an onboard wireless communication apparatus and a wireless set of an embodiment 1 in accordance with the present invention. The in-vehicle system of FIG. 1 comprises an onboard wireless communication apparatus 10 and a wireless set 20 of the embodiment 1. The onboard wireless communication apparatus 10 is a wireless communication apparatus installed inside a vehicle 100, and the wireless set 20 is a wireless set taken into the vehicle 100 by a passenger to be used.

For example, the onboard wireless communication apparatus 10 is employed in a car navigation apparatus or in a rear seat entertainment (RSE) system. In addition, the wireless set 20 is a mobile wireless communication terminal such as a smartphone, a tablet PC, and a portable navigation device (PND).

The onboard wireless communication apparatus 10 comprises a wireless communication apparatus 11, a wireless set charging processor 12 and a wireless set authentication processor 13, and the wireless communication apparatus 11 comprises a first wireless communication unit 11a and a second wireless communication unit 11b. In addition, the wireless set 20 comprises a wireless communication apparatus 21, a charger 22 and an authentication processor 23. The wireless communication apparatus 21 of the wireless set 20 is capable of carrying out wireless communication with the first wireless communication unit 11a or the second wireless communication unit 11b in the wireless communication apparatus 11 the onboard wireless communication apparatus 10 comprises. Specifically, the first wireless communication unit 11a, second wireless communication unit 11b and wireless communication apparatus 21 carry out wireless communication by wireless communication techniques using the same frequency band.

As the wireless communication technique of the wireless communication apparatuses 11 and 21, a technique that uses the same frequency band such as a wireless LAN, Bluetooth, and Kleer (registered trademark: not referred to from now on).

Incidentally, although FIG. 1 shows a case where the first wireless communication unit 11a and the second wireless communication unit 11b use separate antennas, a single antenna terminal can be connected to the first wireless communication unit 11a and to the second wireless communication unit 11b via a distributor to put them together to the single antenna.

In addition, although FIG. 1 shows a case where the first wireless communication unit 11a and the second wireless communication unit 11b are mounted in the wireless communication apparatus 11 of the onboard wireless communication apparatus 10, the second wireless communication unit 11b can be mounted in a wireless communication apparatus other than the wireless communication apparatus 11 of the onboard wireless communication apparatus 10.

Specifically, the onboard wireless communication apparatus 10 of the present embodiment 1 comprises an in-vehicle informing processor that sends information that enables the wireless set 20 to recognize that it is located inside the vehicle 100 to the wireless set 20 which controls, when recognizing that the wireless set 20 is located inside the vehicle 100, its transmit power in such a manner as to prevent an excessive received power level of the second wireless communication apparatus which is the second wireless communication unit 11b that is carrying out, besides the first wireless communication unit 11a serving as a communication partner, the wireless communication inside the vehicle 100 by the wireless communication technique using the same frequency band as the first wireless communication unit 11a. Thus, the wireless set 20, when it is about to carry out the wireless communication with the first wireless communication unit 11a which is a communication partner, controls its transmit power in such a manner as to prevent the excessive received power level of the second wireless communication unit 11b that carries out the wireless communication inside the vehicle 100.

Incidentally, although FIG. 1 shows the case where the wireless communication apparatus 11 comprises the first wireless communication unit 11a and the second wireless communication unit 11b, the wireless communication apparatus 21 of the wireless set 20 can comprise wireless communication units with a plurality of wireless communication techniques using the same frequency band.

In addition, the wireless communication apparatuses 11 and 21 can comprise three or more wireless communication units with wireless communication techniques using the same frequency band.

Furthermore, the first wireless communication unit 11a and the second wireless communication unit 11b can be mounted in separate wireless communication apparatuses, respectively, and the onboard wireless communication apparatus 10 can comprise at least one of the wireless communication apparatuses.

The following description will be made on the assumption that the wireless communication technique of the first wireless communication unit 11a mounted in the wireless communication apparatus 11 the onboard wireless communication apparatus 10 comprises and that of the wireless communication apparatus 21 of the wireless set 20 are "wireless LAN", and the wireless communication technique of the second wireless communication unit 11b of the wireless communication apparatus 11 is "bluetooth".

In addition, the wireless communication apparatus 11 sends its communication connection ID to the wireless communication apparatus serving as a communication partner by the time when establishing the wireless communication. The communication connection ID comprises an identifier (onboard apparatus identifier) peculiar to itself (wireless communication apparatus 11), an identifier of the service (service identifier) the wireless communication apparatus serving as a communication partner can use, and the like.

As the information that enables the wireless set 20 to recognize that it is located inside the vehicle 100, the embodiment 1 employs the communication connection ID the first wireless communication unit 11a sends to the wireless communication apparatus 21 of the wireless set 20 to establish wireless communication with the wireless communication apparatus 21 of the wireless set 20. Thus, the first wireless communication unit 11a in the wireless communication apparatus 11 of the onboard wireless communication apparatus 10 becomes the in-vehicle informing processor.

For example, it forms the communication connection ID using at least one of a carmaker identifier peculiar to the carmaker that produces the vehicle 100, the serial number of the vehicle 100, and the information indicating an in-vehicle network ("In-Vehicle Network"), which are the information about the vehicle 100 the wireless set 20 can recognize. As the information indicating the in-vehicle network, there is ID information indicating the node of the wireless communication apparatus 11 on the network.

The wireless communication apparatus 21 of the wireless set 20 recognizes that it is located inside the vehicle 100 if it identifies one of the carmaker identifier, the serial number of the vehicle 100, and the information indicating the in-vehicle network from the communication connection ID.

The wireless set charging processor 12 is a processor that supplies the power of the onboard battery to the charger 22 of the wireless set 20 as the charging power. Using the charging power from the wireless set charging processor 12, the charger 22 of the wireless set 20 charges the battery of the wireless set 20 (not shown).

As for the connection between the wireless set charging processor 12 and the charger 22, a cable connection such as a USB (Universal Serial Bus) and MHL (Mobile High-definition Link), and a wireless connection like electromagnetic resonance are supposed.

To make a charge between the apparatuses, a prescribed apparatus connection sequence is carried out between the apparatuses after interconnecting them so as to prevent an electrical fault from occurring in the power receiving side apparatus after the power transmitting side apparatus starts transmitting the power unilaterally. In the apparatus connection sequence, ID information for causing the power transmitting side and the power receiving side to recognize each other is exchanged between the apparatuses.

As the information that enables the wireless set 20 to recognize that it is located inside the vehicle 100, the embodiment 1 uses the information the wireless set charging processor 12 sends to the wireless set 20 to transmit the charging power to the wireless set 20. In other words, the wireless set charging processor 12 also becomes the in-vehicle informing processor.

As the information to send, the wireless set charging processor 12 forms, for example, the "Device_ID" exchanged between the apparatuses connected via a USB in the same manner as the communication connection ID by using at least one of the carmaker identifier, the serial number of the vehicle 100 and the information indicating the in-vehicle network, which are the information about the vehicle 100 the wireless set 20 can recognize.

Receiving the Device_ID from the wireless set charging processor 12, the charger 22 of the wireless set 20 supplies it to the wireless communication apparatus 21. When the wireless communication apparatus 21 identifies from the Device_ID one of the carmaker identifier, the serial number of the vehicle 100, and the information indicating the in-vehicle network, it recognizes that it is located inside the vehicle 100.

The wireless set authentication processor 13 is a processor that authenticates the wireless set 20 by executing the authentication processing between it and the authentication processor 23 of the wireless set 20. The authentication processor 23 of the wireless set 20 outputs authentication information necessary for the authentication processing by the wireless set authentication processor 13.

As the connection between the wireless set authentication processor 13 and authentication processor 23, a wireless connection such as Felica (registered trademark: not referred to from now on) or NFC (Near Field Communication) is supposed.

When executing the authentication processing between the apparatuses, the authentication information is transmitted from the apparatus that receives the authentication to the apparatus that authenticates, and the authentication result of the apparatus that makes the authentication using the authentication information is transmitted to the apparatus that receives the authentication.

A future vehicle is expected to use instead of its engine key a wireless set a user possesses. At this time, the onboard apparatus authenticates the wireless set to decide on whether the user is a genuine user of the vehicle or not.

In the embodiment 1, the information the wireless set authentication processor 13 sends to the wireless set 20 to authenticate the wireless set 20 as described above is used as the information that enables the wireless set 20 to recognize that it is located inside the vehicle 100. In other words, the wireless set authentication processor 13 also becomes the in-vehicle informing processor.

As the information to send, the wireless set authentication processor 13 forms a response of the authentication result (authentication response) to be send from the wireless set authentication processor 13 to the wireless set 20 in the same manner as the communication connection ID using one of the carmaker identifier, the serial number of the vehicle 100 and the information indicating the in-vehicle network, which are the information about the vehicle 100 the wireless set 10 can recognize, for example.

Receiving the authentication response from the wireless set authentication processor 13, the authentication processor 23 of the wireless set 20 supplies it to the wireless communication apparatus 21. The wireless communication apparatus 21 recognizes that it is located inside the vehicle 100 when it identifies one of the carmaker identifier, the serial number of the vehicle 100, and the information indicating the in-vehicle network from the authentication response.

Figure 2:
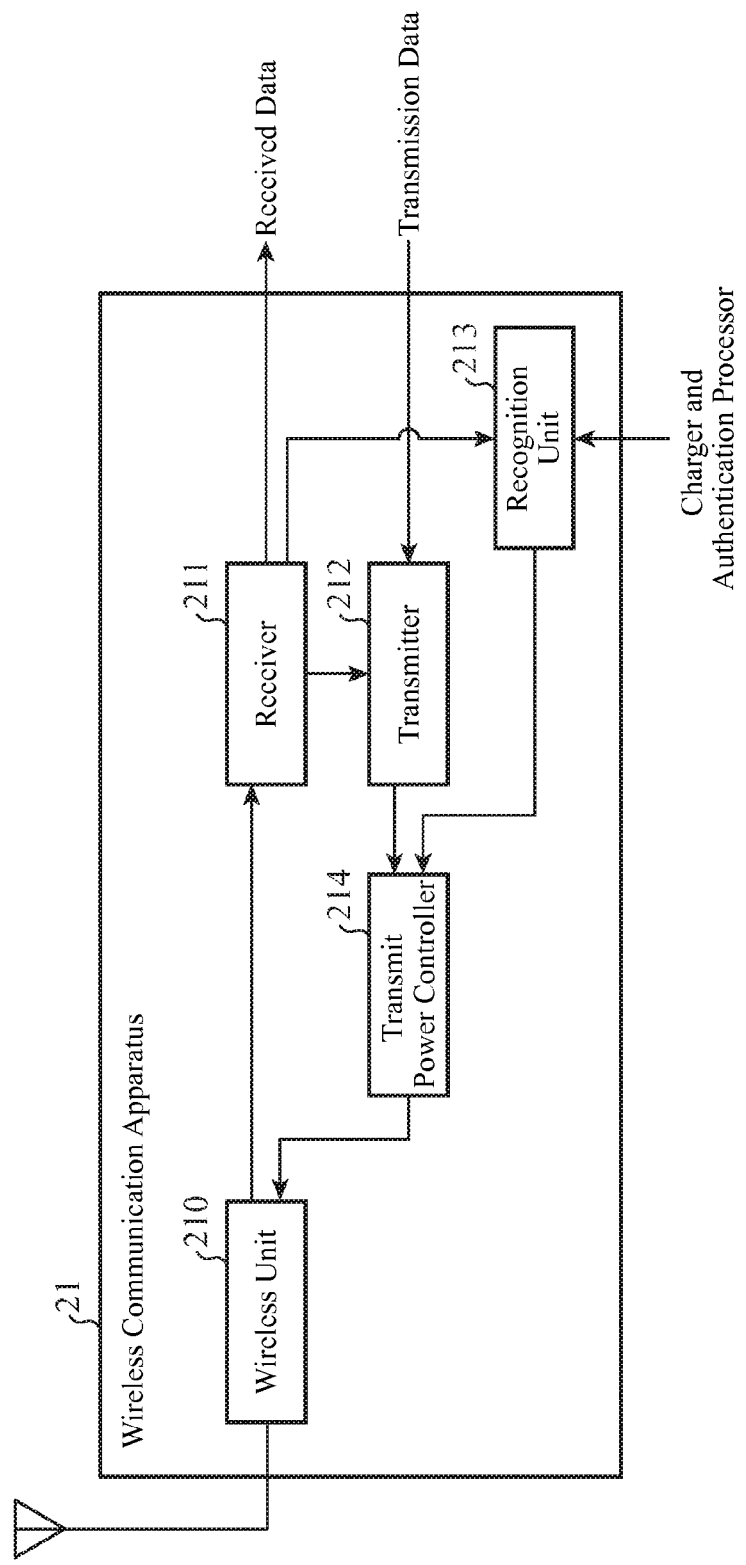
FIG. 2 is a block diagram showing a configuration of a wireless communication apparatus in the wireless set of the embodiment 1.

FIG. 2 is a block diagram showing a configuration of the wireless communication apparatus in the wireless set of the embodiment 1. As shown in FIG. 2, the wireless communication apparatus 21 of the wireless set 20, which is a wireless communication apparatus that carries out wireless communication with the wireless communication apparatus 11 of the onboard wireless communication apparatus 10, comprises a wireless unit 210, a receiver 211, a transmitter 212, a recognition unit 213 and a transmit power controller 214.

The wireless unit 210, which is a wireless unit that extracts from the signal received with the antenna a signal in the frequency band the wireless communication apparatus 21 uses for the wireless communication, is a band-pass filter (BPF) that passes the signal in the use frequency band, for example.

The receiver 211 is a receiver that demodulates the received signal extracted by the wireless unit 210 and picks out the received data. Although not shown in FIG. 2, it comprises, for example, a low-noise amplifier that amplifies the input level of the received signal extracted by the wireless unit 210; a frequency converter unit that converts the output signal of the low-noise amplifier to an intermediate frequency signal or to a signal with a frequency capable of being demodulated; a demodulation unit that restores a baseband signal by applying demodulation processing to the signal output from the frequency converter unit; and a receiving controller that picks out the received data from the baseband signal restored by the demodulation unit.

The transmitter 212 is a transmitter that transmits via the wireless unit 210 the transmission signal generated by modulating the input transmission data. For example, although not shown in FIG. 2, it comprises a transmission controller that receives the transmission data from the outside of the wireless communication apparatus 21 and supplies to a modulation unit; the modulation unit that applies modulation processing to the transmission data supplied from the transmission controller, and generates the baseband signal for the wireless communication; and a frequency converter unit that converts the frequency of the output signal of the modulation unit (transmission signal) to a high-frequency signal used for the wireless communication.

The recognition unit 213 executes the processing of recognizing that it is located inside the vehicle 100 from the information sent from the onboard wireless communication apparatus 10. For example, the recognition unit 213 has the carmaker identifier, the serial number of the vehicle 100 and the information indicating the in-vehicle network that are set in advance. The recognition unit 213 recognizes that the wireless set 20 is located inside the vehicle 100 if the information sent from the onboard wireless communication apparatus 10 to one of the receiver 211, charger 22 and authentication processor 23 contains the information about the vehicle 100, which the wireless set 20 can recognize.

When the recognition unit 213 recognizes that the wireless set 20 is located inside the vehicle 100, the transmit power controller 214 executes the processing of controlling the transmit power so as to prevent an excessive received power level of the wireless communication unit 11a or 11b which is a communication partner.

For example, the transmit power controller 214 can be realized with an attenuator that attenuates the power level of the output signal (transmission signal) from the transmitter 212. Incidentally, it is assumed that the attenuator is turned on ("through" when it is off) at the time when the recognition unit 213 recognizes that the wireless set 20 is inside the vehicle 100 and is capable of setting any desired attenuation.

In addition, the transmit power controller 214 can be comprised of a regulator that can control the power level of the output signal (transmission signal) from the transmitter 212. If the noise power level fluctuates in the use frequency band, there are some cases where the transmit power controller 214 controls the transmit power level so far in such a manner as to increase it up to the upper limit power level that can prevent the excessive received power level of the wireless communication unit.

Figure 3:
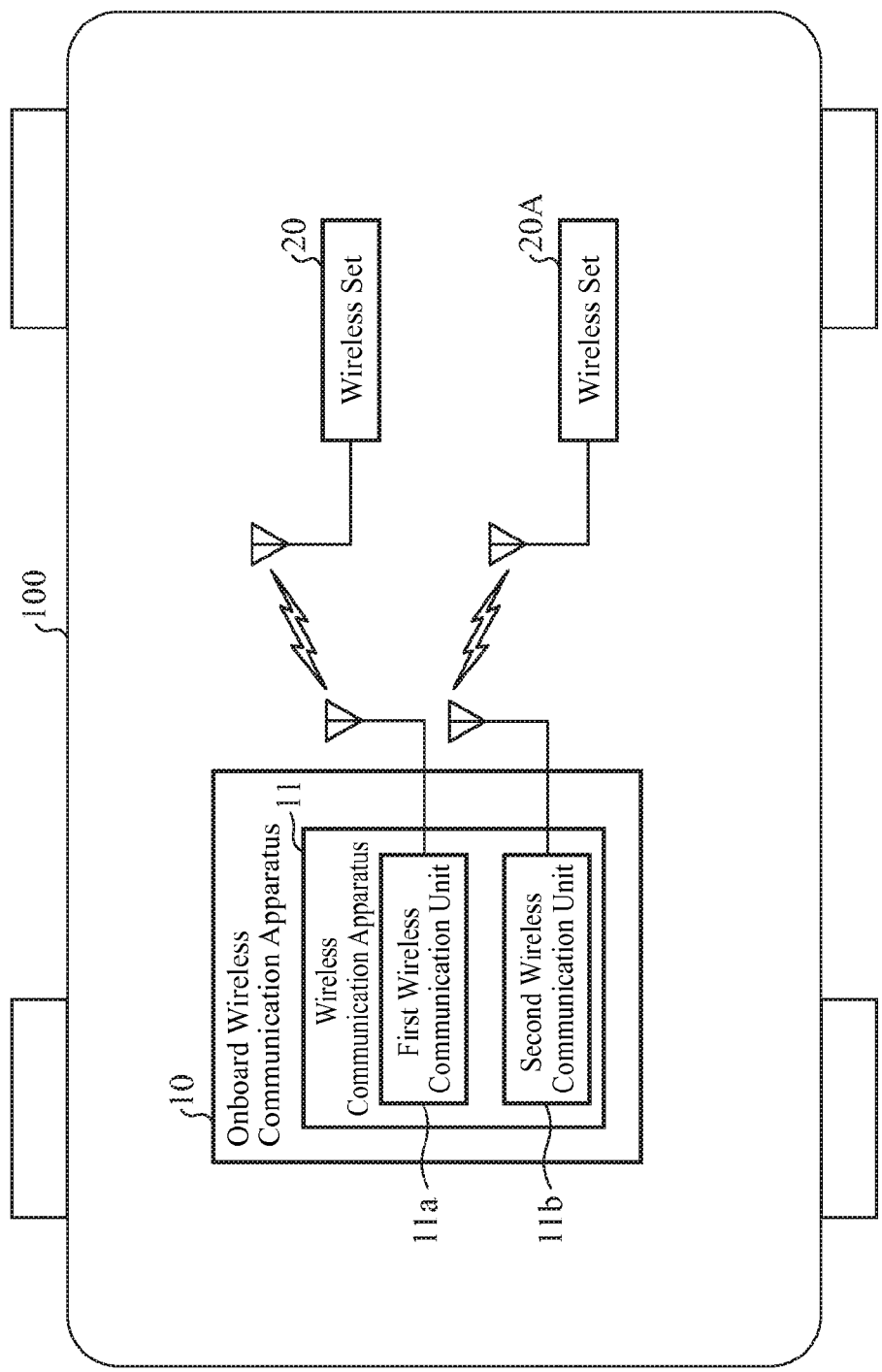
FIG. 3 is a schematic diagram showing a communication connection mode between the onboard wireless communication apparatus and the wireless set of the embodiment 1.

FIG. 3 is a schematic diagram showing a mode of the communication connection between the onboard wireless communication apparatus and the wireless set of the embodiment 1. In FIG. 3, the onboard wireless communication apparatus 10 is an onboard apparatus like a car navigation apparatus, and the wireless sets 20 and 20A are a communication device taken into the vehicle 100. In addition, the first wireless communication unit 11a in the wireless communication apparatus 11 of the onboard wireless communication apparatus 10 is about to carry out wireless communication with the wireless set 20 through a wireless LAN, and the second wireless communication unit 11b at this time is assumed to be carrying out wireless communication with the wireless set 20A by Bluetooth.

For example, a case is conceivable in which while the wireless set 20A, a smartphone, is carrying out hands-free conversation after establishing a wireless communication connection with the second wireless communication unit 11b by Bluetooth, the wireless set 20, a portable personal computer or the like, is about to carry out data communication with the first wireless communication unit 11a via a wireless LAN.

The first wireless communication unit 11a and the second wireless communication unit 11b have a function to avoid radio wave interference individually. For example, the wireless communication apparatus 11 employs the CSMA/CA (Carrier Sense Multiple Access with Collision Avoidance) function specified by IEEE802.11b/g/n to make a decision on whether or not the frequency band the first wireless communication unit 11a is to use is used by a wireless set using a different wireless LAN or a different wireless communication technique from a measured result of an actual radio wave use state (the function of the communication activity deciding unit which will be described later with reference to FIG. 7). Here, the first wireless communication unit 11a carries out communication only when the wireless communication apparatus 11 decides that the frequency band is not used by a wireless set which is other than the communication partner and which uses a different wireless LAN or a different wireless communication technique, thereby avoiding the interference and collision with the wireless set using the different wireless LAN or different wireless communication technique.

In addition, the second wireless communication unit 11b uses an AFH (Auto Frequency Hopping) function specified in the version 1.2 of the Bluetooth SIG (Special Interest Group) to monitor a communication state of individual hopping frequencies used in the spread spectrum communication, and reduces deterioration of the communication quality by removing a frequency with a bad communication state due to interference or the like from a hopping frequency list.

For example, Bluetooth carries out spread spectrum communication by repeating the frequency hopping of a signal with a frequency width of 1 MHz (79 channels in total) in a frequency of 2.402 GHz-2.480 GHz at a period of 625 μsec. At this time, a channel whose communication state deteriorates because of interference from a different wireless set can be removed from the hopping frequency list by the AFH function. Incidentally, the wireless LAN carries out communication by occupying a frequency band of about 20 MHz per channel.

Conventionally, the Bluetooth and the wireless LAN separate their frequency channels so as to avoid interference to each other, and to prevent the reduction in the transmission efficiency of the first wireless communication unit 11a and the second wireless communication unit 11b.

However, it is when the received power level of the first wireless communication unit 11a and that of the second wireless communication unit 11b are not excessive that the radio wave interference can be suppressed by controlling the frequency channel assignment. If the first wireless communication unit 11a starts wireless communication via the wireless LAN while the second wireless communication unit 11b is carrying out wireless communication by Bluetooth within the in-vehicle space as shown in FIG. 3, the second wireless communication unit 11b receives excessive input owing to the received power level of the wireless LAN between the first wireless communication unit 11a and the wireless set 20 depending on the location of the wireless set 20. In this case, if the communication is carried out through this frequency channel, the second wireless communication unit 11b suffers excessive input. If the received power level becomes excessive, the amplifier that amplifies it operates in the nonlinear region, thereby deteriorating the received signal and being likely to disable its receiving.

Incidentally, since the received power level of a wireless signal within the in-vehicle space is kept in a state in which it converges to a particular level which is comparatively high, a fault of bringing about an excessive received power level is likely to occur.

In view of this, the embodiment 1 sends, to the wireless set 20 that is about to carry out wireless communication with the first wireless communication unit 11a, the information that enables the wireless set 20 to recognize that it is located inside the vehicle 100, and causes the wireless set 20 to control the transmit power in such a manner as to prevent the excessive received power level of the second wireless communication unit 11b that is carrying out the wireless communication besides the first wireless communication unit 11a. In this way, the embodiment 1 reduces the deterioration of the communication quality inside the vehicle 100.

Next the operation will be described.

Figure 4:
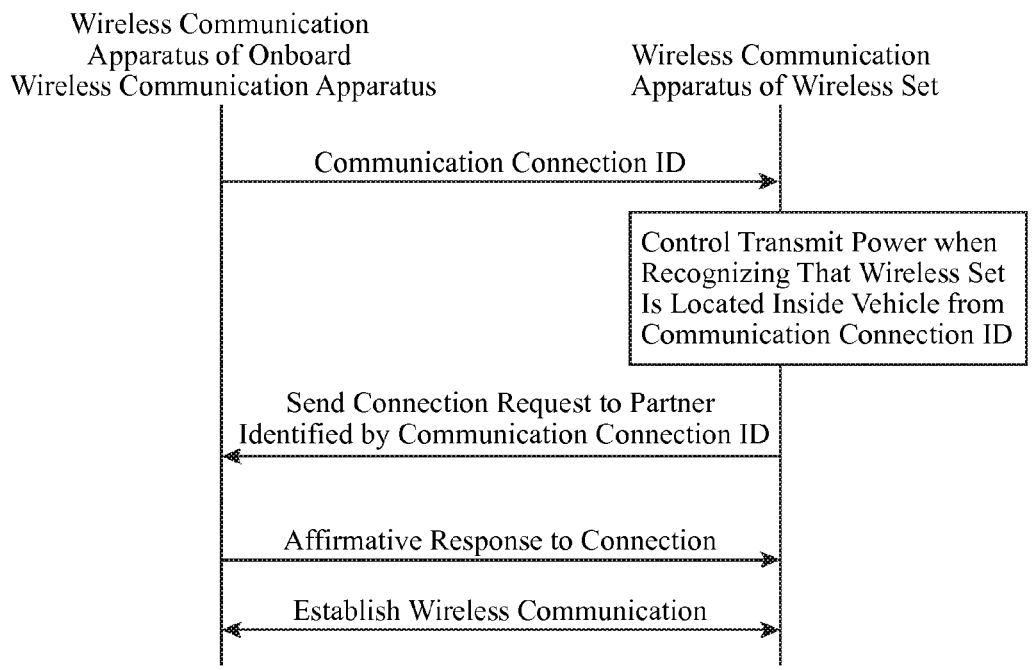
FIG. 4 is a diagram showing a sequence up to the establishment of the wireless communication between the onboard wireless communication apparatus and the wireless set of the embodiment 1.

FIG. 4 is a diagram showing a sequence until the wireless communication is established between the onboard wireless communication apparatus and the wireless set of the embodiment 1. Here an example is shown in which the first wireless communication unit 11a is about to carry out the wireless communication with the wireless set 20 via the wireless LAN while the second wireless communication unit 11b is carrying out wireless communication with the wireless set 20A by Bluetooth.

First, the first wireless communication unit 11a in the wireless communication apparatus 11 of the onboard wireless communication apparatus 10 transmits the communication connection ID necessary for establishing wireless communication via the wireless LAN to the wireless communication apparatus 21 of the wireless set 20. The communication connection ID constitutes the information that enables the wireless set 20 to recognize that it is located inside the vehicle 100. For example, the communication connection ID is composed of at least one of the carmaker identifier, the serial number of the vehicle 100, and the information indicating the in-vehicle network.

The wireless communication apparatus 21 of the wireless set 20 controls, when it recognizes that it is located inside the vehicle 100 from the communication connection ID, the transmit power so as to prevent the excessive received power level of the second wireless communication unit 11b. For example, in the wireless communication apparatus 21 of the wireless set 20, when the recognition unit 213 analyzes the communication connection ID received by the receiver 211 and detects the above-mentioned information about the vehicle 100, it recognizes that the wireless set 20 is located inside the vehicle 100. When the recognition unit 213 obtains the recognition result, it controls the transmit power controller 214 and turns it on. This causes the transmit power controller 214 to control and attenuate the transmit power of the transmission signal from the transmitter 212 so as to prevent the excessive received power level of the second wireless communication unit 11b.

Incidentally, it is also possible to carry out control in such a manner as to raise the transmit power of the transmission signal within a range that enables avoiding the excessive received power level of the second wireless communication unit 11b.

On the other hand, the receiver 211 of the wireless communication apparatus 21 identifies the first wireless communication unit 11a of the onboard wireless communication apparatus 10, which is the information source, from the communication connection ID. The information about the communication partner is supplied from the receiver 211 to the transmitter 212 of the wireless communication apparatus 21. This causes the transmitter 212 to request the communication partner (first wireless communication unit 11a) identified by the communication connection ID to establish a communication connection. The first wireless communication unit 11a sends an affirmative response that confirms the communication connection to the communication connection request, thereby establishing the wireless communication with the wireless set 20.

In this way, the information (communication connection ID) sent from the first wireless communication unit 11a to the wireless set 20 during the negotiation period before the establishment of the wireless communication is used as the information that enables the wireless set 20 to recognize that it is located inside the vehicle 100. Since this enables the wireless set 20 to control its transmit power before carrying out the wireless communication, it does not have a bad effect on the existing other wireless communication.

As for the example of FIG. 3, the wireless set 20 can carry out the wireless communication with the first wireless communication unit 11a via the wireless LAN at the transmit power controlled in such a manner as not to affect the wireless communication between the second wireless communication unit 11b and the wireless set 20A which has already been carried out by Bluetooth.

Alternatively, the information that enables the wireless set 20 to recognize that it is located inside the vehicle 100 can be sent from the onboard wireless communication apparatus 10 to the wireless set 20 via a connection for charging.

Figure 5:
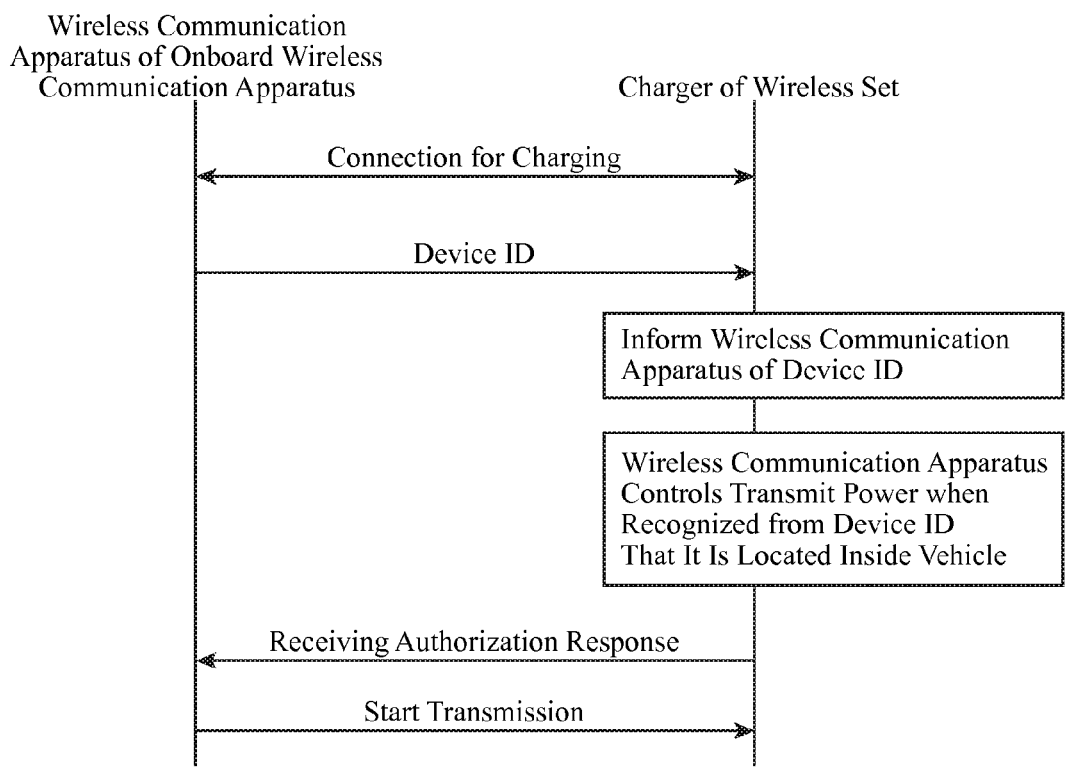
FIG. 5 is a diagram showing a sequence up to a start of charging transmission to the wireless set by the onboard wireless communication apparatus of the embodiment 1.

FIG. 5 is a diagram showing a sequence until the onboard wireless communication apparatus of the embodiment 1 starts charging transmission to the wireless set. Here, an example will be described in which while the second wireless communication unit 11b is carrying out wireless communication with the wireless set 20A by Bluetooth, and while the onboard wireless communication apparatus 10 is charging the wireless set 20, the first wireless communication unit 11a is about to carry out wireless communication with the wireless set 20 via the wireless LAN.

First, the wireless set charging processor 12 of the onboard wireless communication apparatus 10 is connected with the charger 22 of the wireless set 20 by cable or wireless. It is assumed here that the connection for charging is established between them through a USB.

Once the connection for charging is established, the wireless set charging processor 12 transmits to the charger 22 of the wireless set 20 a device ID necessary for transmitting the charging power to the wireless set 20. The device ID constitutes the information that enables the wireless set 20 to recognize that it is located inside the vehicle 100. For example, just as the communication connection ID, the device ID is composed of at least one of the carmaker identifier, the serial number of the vehicle 100 and the information indicating the in-vehicle network.

The charger 22 supplies the device ID it acquires from the onboard wireless communication apparatus 10 to the wireless communication apparatus 21. When the wireless communication apparatus 21 recognizes from the device ID that it is located inside the vehicle 100, it controls the transmit power in such a manner as to prevent the excessive received power level of the second wireless communication unit 11b. For example, in the wireless communication apparatus 21 of the wireless set 20, when the recognition unit 213 analyzes the device ID acquired by the charger 22 and detects the above-mentioned information about the vehicle 100, it recognizes that the wireless set 20 is located inside the vehicle 100. When the recognition unit 213 obtains the recognition result, it controls the transmit power controller 214 and turns it on. This causes the transmit power controller 214 to control and attenuate the transmit power of the transmission signal from the transmitter 212 so as to prevent the excessive received power level of the second wireless communication unit 11b.

Incidentally, it is also possible to carry out control in such a manner as to raise the transmit power of the transmission signal within a range that enables avoiding the excessive received power level of the second wireless communication unit 11b.

On the other hand, the charger 22 identifies from the device ID the wireless set charging processor 12 of the onboard wireless communication apparatus 10, which is the information source, as the power transmitting side apparatus, and transmits a receiving authorization response to the wireless set charging processor 12. This causes the wireless set charging processor 12 to start transmission of the charging power to the charger 22 of the wireless set 20. The charger 22 charges the battery of the wireless set 20 with the charging power.

In this way, the information (device ID, for example) sent from the wireless set charging processor 12 to the charger 22 of the wireless set 20 during the negotiation period for starting the charging processing is used as the information that enables the wireless set 20 to recognize that it is located inside the vehicle 100. Since this enables the wireless set 20 to control its transmit power through the connection for charging, it does not have a bad effect on the existing other wireless communication even if the wireless set 20 carries out the wireless communication after that.

The information that enables the wireless set 20 to recognize that it is located inside the vehicle 100 can also be sent from the onboard wireless communication apparatus 10 to the wireless set 20 via a connection for authentication.

Figure 6:
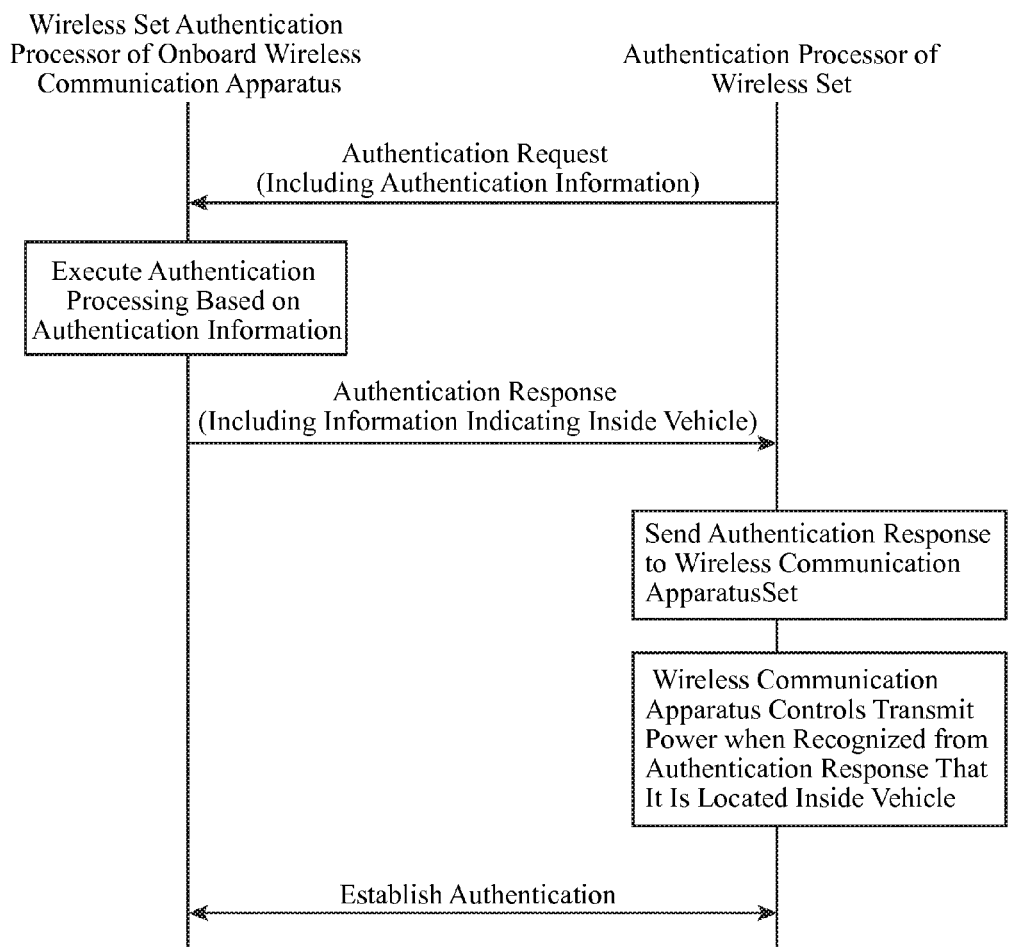
FIG. 6 is a diagram showing a sequence until authentication of the wireless set by the onboard wireless communication apparatus of the embodiment 1 is carried out.

FIG. 6 is a diagram showing a sequence until the onboard wireless communication apparatus of the embodiment 1 authenticates the wireless set. Here, an example will be described in which while the second wireless communication unit 11b is carrying out wireless communication with the wireless set 20A by Bluetooth, the onboard wireless communication apparatus 10 authenticates the wireless set 20, and then the first wireless communication unit 11a carries out the wireless communication with the wireless set 20 via the wireless LAN.

First, the wireless set authentication processor 13 of the onboard wireless communication apparatus 10 is connected with the authentication processor 23 of the wireless set 20 by NFC or the like. At this time, the authentication processor 23 of the wireless set 20 transmits an authentication request to the wireless set authentication processor 13. The authentication request includes authentication information such as identification information peculiar to the user of the wireless set 20.

The wireless set authentication processor 13 executes the authentication processing of the wireless set 20 according to the authentication information contained in the authentication request. When it authenticates the user of the wireless set 20, the wireless set authentication processor 13 transmits an authentication response indicating the authentication result to the authentication processor 23 of the wireless set 20.

Here, the authentication response constitutes the information that enables the wireless set 20 to recognize that it is located inside the vehicle 100. For example, just as the communication connection ID, the authentication response is composed of at least one of the carmaker identifier, the serial number of the vehicle 100 and the information indicating the in-vehicle network.

The authentication processor 23 supplies the wireless communication apparatus 21 with the authentication response acquired from the onboard wireless communication apparatus 10. When the wireless communication apparatus 21 recognizes that it is located inside the vehicle 100 from the authentication response, it controls its transmit power so as to prevent the excessive received power level of the second wireless communication unit 11b.

For example, in the wireless communication apparatus 21 of the wireless set 20, when the recognition unit 213 analyzes the authentication response acquired from the authentication processor 23 and detects the information about the vehicle 100, it recognizes that the wireless set 20 is located inside the vehicle 100. Obtaining the recognition result, the recognition unit 213 controls the transmit power controller 214 and turns it on. This causes the transmit power controller 214 to control and attenuate the transmit power of the transmission signal from the transmitter 212 so as to prevent the excessive received power level of the second wireless communication unit 11b.

Incidentally, it is also possible to raise the transmit power of the transmission signal within a range that enables avoiding the excessive received power level of the second wireless communication unit 11b.

On the other hand, the authentication processor 23 establishes the authentication by the onboard wireless communication apparatus 10 according to the authentication response.

This enables the wireless set 20 to receive various services in cooperation with the onboard wireless communication apparatus 10. For example, since the authentication processing enables controlling the transmit power of the wireless set 20, even if the wireless set 20 carries out wireless communication with the first wireless communication unit 11a after that, it does not have a bad effect on the existing other wireless communication.

Incidentally, the foregoing description shows an example in which the onboard wireless communication apparatus 10 sends the information that enables the wireless set 20 to recognize that it is located inside the vehicle 100 during the negotiation period before establishing the wireless communication, during the negotiation period when executing the charging processing, and during the negotiation period in the authentication processing. In this case, although the foregoing information can be sent in all the periods, it can be sent in any one of the periods.

In addition, the foregoing information can be sent in a period other than the foregoing periods as long as it is a negotiation period in which the onboard wireless communication apparatus 10 sends the information to the wireless set 20.

For example, a configuration is also possible in which the onboard wireless communication apparatus 10 is connected with the wireless set 20 via other external apparatus. In this case, the in-vehicle informing processor of the onboard wireless communication apparatus 10 sends the information that enables the wireless set 20 to recognizes that it is located inside the vehicle 100 via the external apparatus.

As described above, according to the present embodiment 1, the onboard wireless communication apparatus 10 including besides the first wireless communication unit 11a which is the wireless communication apparatus serving as a communication partner of the wireless set 20, the second wireless communication unit 11b which is other wireless communication apparatus that is carrying out the wireless communication inside the vehicle 100 by the wireless communication technique using the same frequency band as the first wireless communication unit 11a, comprises the in-vehicle informing processor that sends to the wireless set 20 the information that enables the wireless set 20 to recognize that it is located inside the vehicle, wherein the wireless set 20 controls, when it recognizes that it is located inside the vehicle 100, its transmit power so as to prevent the excessive received power level of the second wireless communication unit 11b.

In addition, the wireless set 20 comprises the recognition unit 213 that recognizes that it is located inside the vehicle 100 according to the information sent from the onboard wireless communication apparatus 10; and the transmit power controller 214 that controls, when the recognition unit 213 recognizes that it is located inside the vehicle 100, the transmit power so as to prevent an excessive received power level of the second wireless communication unit 11b which is other wireless communication apparatus that is carrying out the wireless communication inside the vehicle 100 by the wireless communication technique using the same frequency band as the first wireless communication unit 11a which is the wireless communication apparatus serving as a communication partner of the wireless set 20.

The onboard wireless communication system with the configuration can improve the communication quality by reducing the deterioration of the receiving performance due to the excessive received power level.

In addition, according to the present embodiment 1, the in-vehicle informing processor is the first wireless communication unit 11a of the wireless communication apparatus 11, and the information that enables the wireless set 20 to recognize that it is located inside the vehicle 100 is the ID information formed by incorporating the information about the vehicle 100 the wireless set 20 can recognize into the communication connection ID the first wireless communication unit 11a sends to the wireless set 20 to establish wireless communication with the wireless set 20. By thus doing, since the transmit power of the wireless set 20 is controlled before carrying out the wireless communication, the present embodiment 1 can improve the communication quality by reducing the deterioration of the receiving performance in the existing other wireless communication.

Furthermore, according to the present embodiment 1, the in-vehicle informing processor is the wireless set charging processor 12 that transmits charging power to the wireless set 20, and the information that enables the wireless set 20 to recognize that it is located inside the vehicle 100 is the information formed by incorporating the information about the vehicle 100 the wireless set 20 can recognize into the information the wireless set charging processor 12 sends to the wireless set 20 to transmit the charging power to the wireless set 20. With such a configuration, the present embodiment 1 can control the transmit power of the wireless set 20 in the charging processing, thereby being able to improve the communication quality by reducing the deterioration of the receiving performance in the existing other wireless communication.

Furthermore, according to the present embodiment 1, the in-vehicle informing processor is the wireless set authentication processor 13 that executes the authentication processing of the wireless set 20, and the information that enables the wireless set 20 to recognize that it is located inside the vehicle 100 is the information formed by incorporating the information about the vehicle 100 the wireless set 20 can recognize into the information the wireless set authentication processor 13 sends to the wireless set 20 to authenticate the wireless set 20.

With such a configuration, the present embodiment 1 can control the transmit power of the wireless set 20 in the authentication processing, thereby being able to improve the communication quality by reducing the deterioration of the receiving performance in the existing other wireless communication.

Embodiment 2

In the onboard wireless communication apparatus of an embodiment 2, an in-vehicle informing processor instructs, when it decides that other wireless communication is being carried out, the wireless set 20 serving as a communication partner to control the transmit power, and instructs, when it does not decide that other wireless communication is being carried out, the wireless set 20 serving as a communication partner not to control the transmit power. In addition, the onboard wireless communication apparatus 10 determines the transmit power level that prevents the excessive received power level of its wireless communication unit, and sends it to the wireless set 20.

Figure 7:
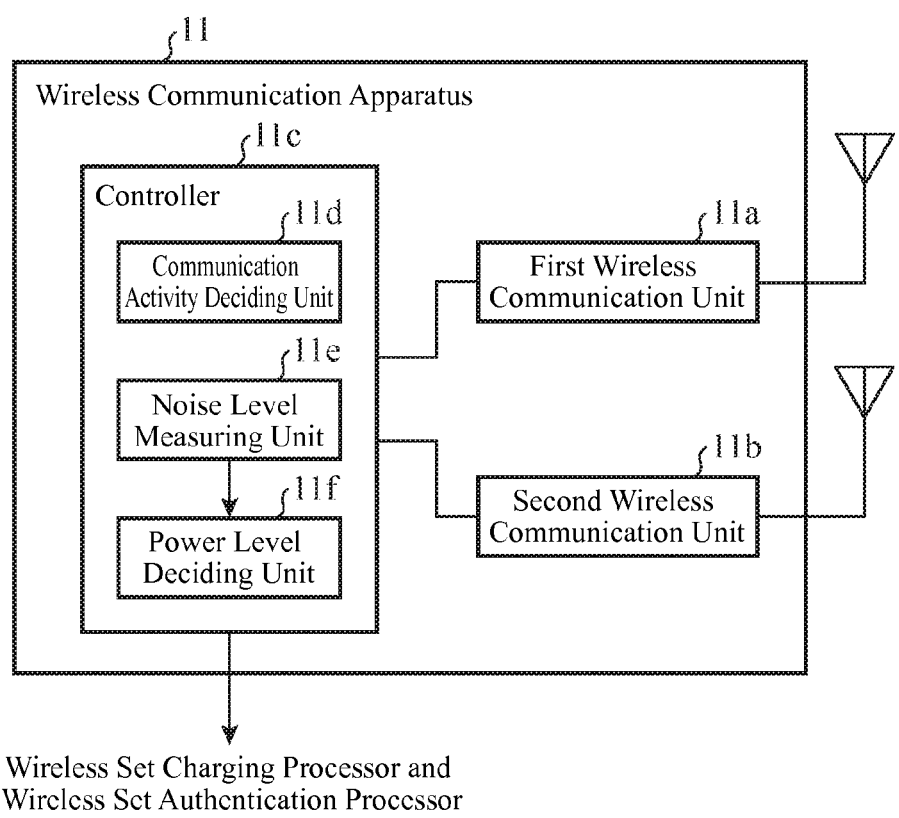
FIG. 7 is a block diagram showing a configuration of a wireless communication apparatus of an onboard wireless communication apparatus of an embodiment 2 in accordance with the present invention.

FIG. 7 is a block diagram showing a configuration of a wireless communication apparatus of the onboard wireless communication apparatus of the embodiment 2 in accordance with the present invention. As shown in FIG. 7, the wireless communication apparatus 11 of the onboard wireless communication apparatus 10 of the embodiment 2 comprises a first wireless communication unit 11a, a second wireless communication unit 11b and a controller 11c. The controller 11c is a controller that controls the wireless communication of the first wireless communication unit 11a and that of the second wireless communication unit 11b, and comprises as its functional components, a communication activity deciding unit 11d, a noise level measuring unit 11e and a power level deciding unit 11f.

The communication activity deciding unit 11d executes, when the first wireless communication unit 11a is about to carry out wireless communication with the wireless set 20, for example, the processing of deciding on whether the second wireless communication unit 11b other than the first wireless communication unit 11a is carrying out wireless communication with the second wireless set 20A or not. For example, using the CSMA/CA function, it decides, from a measurement result of an actual radio wave use state, on whether the frequency band the first wireless communication unit 11a is to use is being used by a wireless set using a different wireless LAN or a different wireless communication technique.

Incidentally, the second wireless communication unit 11b can be installed in a wireless communication apparatus other than the wireless communication apparatus 11 of the onboard wireless communication apparatus 10. In this case, the communication activity deciding unit 11d communicates, for example, with the wireless communication apparatus comprising the second wireless communication unit 11b, and decides on whether the second wireless communication unit 11b is carrying out the wireless communication or not.

The controller 11c forms a request as to whether it is appropriate to control the transmit power according to the information indicating whether other wireless communication is present or not, which the communication activity deciding unit lid decides, and transmits it to the wireless set charging processor 12 or wireless set authentication processor 13.

The noise level measuring unit lie executes, when the first wireless communication unit 11a is about to carry out the wireless communication with the wireless set 20, for example, the processing of measuring a noise power level (referred to as "noise level N" from now on) of the frequency band the first wireless communication unit 11a uses.

The power level deciding unit 11f executes the processing of determining the transmit power level that enables preventing an excessive received power level of the second wireless communication unit 11b other than the first wireless communication unit 11a according to the noise level N which indicates the receiving state of the first wireless communication unit 11a and which is measured by the noise level measuring unit 11e.

The information about the power level determined is sent from the power level deciding unit 11f to the wireless set charging processor 12 or wireless set authentication processor 13.

Next the operation will be described.

Figure 8:
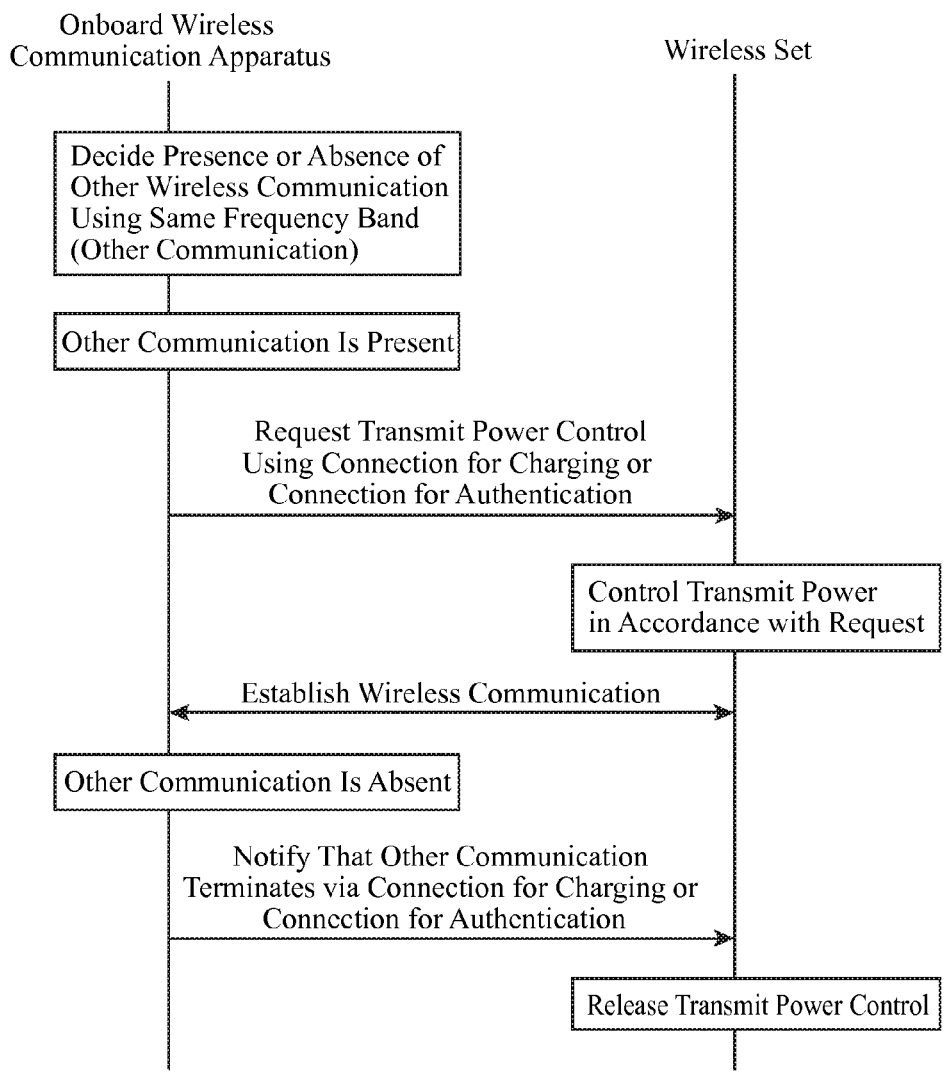
FIG. 8 is a diagram showing a sequence of the transmit power control (example 1) of the wireless set by the onboard wireless communication apparatus of the embodiment 2.

FIG. 8 is a diagram showing a sequence of the transmit power control (example 1) of the wireless set according to the onboard wireless communication apparatus of the embodiment 2. Just as FIG. 3, FIG. 8 shows a case where the first wireless communication unit 11a is about to carry out wireless communication with the wireless set 20 via a wireless LAN, while the second wireless communication unit 11b is carrying out wireless communication with the wireless set 20A by Bluetooth.

First, the communication activity deciding unit 11d of the onboard wireless communication apparatus 10 decides on whether the second wireless communication unit 11b is carrying out wireless communication with the second wireless set 20A or not. The decision is continued even after the first wireless communication unit 11a starts the wireless communication with the wireless set 20.

Here, while the second wireless communication unit 11b is carrying out the wireless communication with the second wireless set 20A, the controller 11c creates a request instructing the wireless set 20 to control the transmit power, and sends it to the wireless set charging processor 12 or wireless set authentication processor 13.

The wireless set charging processor 12 or wireless set authentication processor 13 serving as the in-vehicle informing processor transmits the request instructing the wireless set 20 to control the transmit power according to the procedure of FIG. 5 or FIG. 6 shown in the embodiment 1.

The request is supplied from the charger 22 or authentication processor 23 to the wireless communication apparatus 21.

When the wireless communication apparatus 21 recognizes that it should control the transmit power from the request, it controls the transmit power so as to prevent the excessive received power level of the second wireless communication unit 11b.

For example, in the wireless communication apparatus 21 of the wireless set 20, the recognition unit 213 analyzes the request acquired by the charger 22 or authentication processor 23, and recognizes that it should control the transmit power. Obtaining the recognition result, the recognition unit 213 controls the transmit power controller 214 and turns it on. This causes the transmit power controller 214 to control and attenuate the transmit power of the transmission signal from the transmitter 212 so as to prevent the excessive received power level of the second wireless communication unit 11b.

Incidentally, it is also possible to control and raise the transmit power of the transmission signal within the range that enables preventing the excessive received power level of the second wireless communication unit 11b.

After that, even when the wireless communication is established and started between the first wireless communication unit 11a and the wireless set 20, the wireless set 20 can continue the wireless communication via the wireless LAN at the transmit power controlled in such a manner as to have no effect on the wireless communication between the second wireless communication unit lib and wireless set 20A by Bluetooth.

During the wireless communication between the first wireless communication unit 11a and the wireless set 20, if the communication activity deciding unit 11d decides that the wireless communication between the second wireless communication unit lib and the second wireless set 20A has been completed (when there is no other communication), the controller 11c creates a request instructing the wireless set 20 to release the transmit power control, and transmits it to the wireless set charging processor 12 or wireless set authentication processor 13.

The wireless set charging processor 12 or wireless set authentication processor 13 serving as the in-vehicle informing processor transmits the request instructing to release the transmit power to the wireless set 20 in the same manner as the procedure of FIG. 5 or FIG. 6.

The request is supplied from the charger 22 or authentication processor 23 to the wireless communication apparatus 21.

When the wireless communication apparatus 21 recognizes from the request that it should release the transmit power control, it terminates the transmit power control.

For example, in the wireless communication apparatus 21 of the wireless set 20, the recognition unit 213 analyzes the request acquired through the charger 22 or authentication processor 23, and recognizes that it should release the transmit power control. When the recognition unit 213 obtains the recognition result, it controls the transmit power controller 214 and turns it off. This causes the transmitter 212 to transmit the transmission signal at the original transmit power.

In this way, the present embodiment 2 can appropriately control the transmit power of the wireless set 20 in the communication state that is likely to affect the wireless communication of the wireless set 20A. In addition, it can carry out the wireless communication at the original transmit power unless it is likely to affect the wireless communication of the wireless set 20A (when there is no other communication).

Alternatively, the onboard wireless communication apparatus 10 can determine the transmit power level that enables preventing the excessive received power level of its wireless communication unit, and can send it to the wireless set 20 serving as a communication partner.

Figure 9:
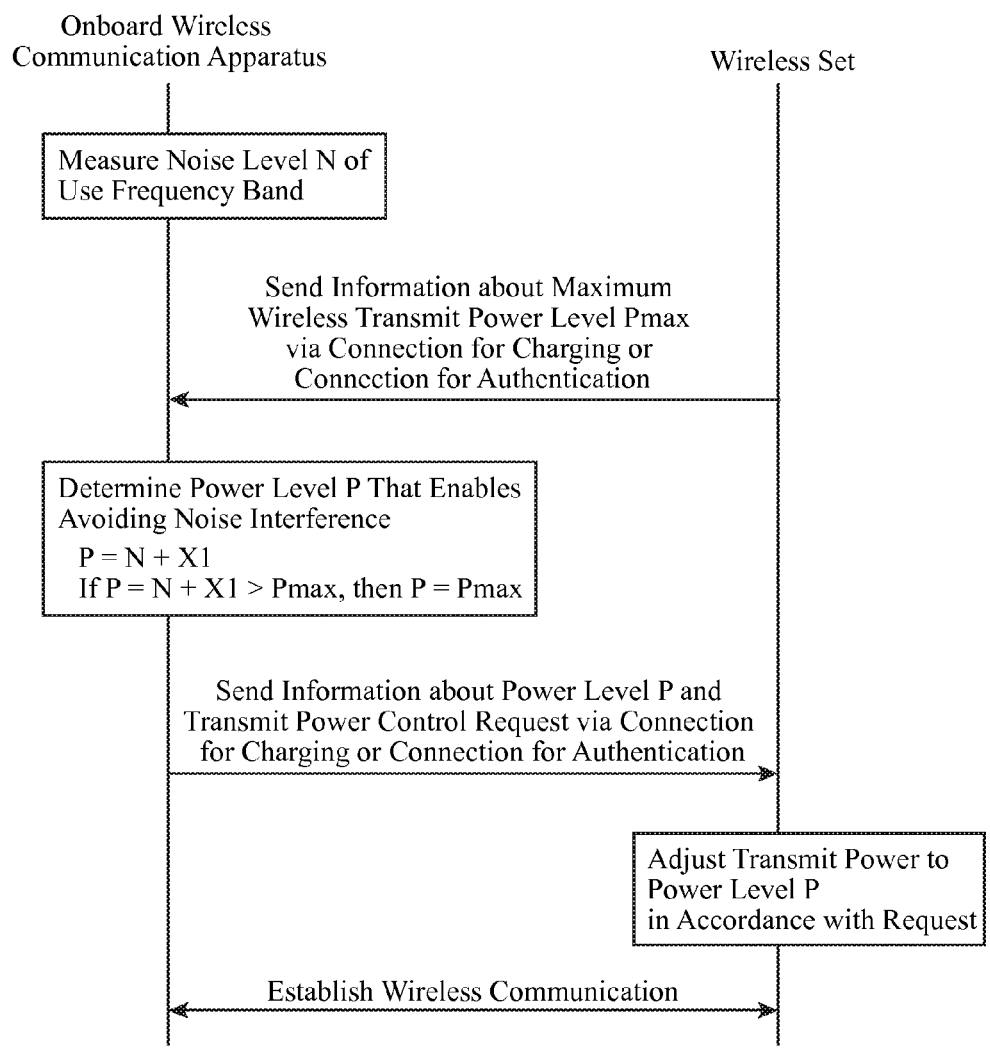
FIG. 9 is a diagram showing a sequence of the transmit power control (example 2) of the wireless set by the onboard wireless communication apparatus of the embodiment 2.

FIG. 9 is a diagram showing a sequence of the transmit power control (example 2) of the wireless set according to the onboard wireless communication apparatus of the embodiment 2. Incidentally, just as FIG. 3, FIG. 9 shows the case where the first wireless communication unit 11a is about to carry out the wireless communication with the wireless set 20 via the wireless LAN while the second wireless communication unit 11b is carrying out wireless communication with the wireless set 20A by Bluetooth.

First, the noise level measuring unit 11e measures the noise level N of the frequency band the first wireless communication unit 11a uses.

In addition, the charger 22 or authentication processor 23 of the wireless set 20 transmits the information of itself indicating the maximum wireless transmit power level Pmax to the wireless set charging processor 12 or wireless set authentication processor 13 of the onboard wireless communication apparatus 10 via the connection for charging or connection for authentication.

The wireless set charging processor 12 or wireless set authentication processor 13 supplies the information indicating the maximum wireless transmit power level Pmax of the wireless set 20 to the power level deciding unit 11f of the wireless communication apparatus 11.

The power level deciding unit 11f determines the transmit power level P that will prevent the excessive received power level of the second wireless communication unit 11b from the noise level N measured by the noise level measuring unit 11e.

Figure 10:
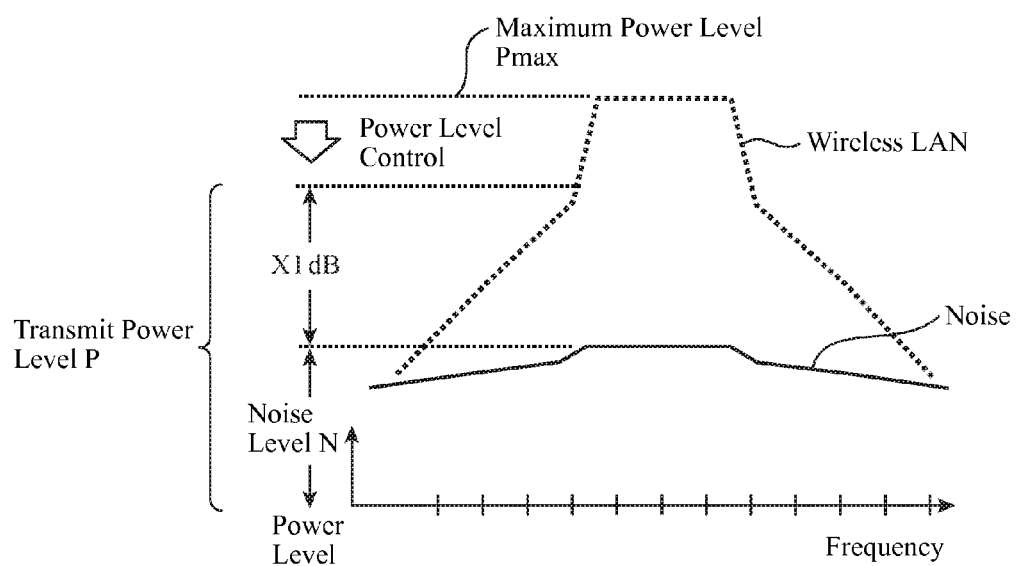
FIG. 10 is a diagram showing a received power level of the wireless LA in the embodiment 2.

For example, the transmit power level in the frequency band used by the wireless LAN of the wireless set 20 is as shown by broken lines in FIG. 10. The power level deciding unit 11f employs as the transmit power level P the value that prevents the excessive received power level of the second wireless communication unit 11b, that is, the value P (=X1+ N) obtained by adding prescribed X1 dB, which is the upper limit that can prevent the noise interference, to the noise level N.

Incidentally, if the transmit power level P exceeds the maximum wireless transmit power level Pmax, the transmit power level P is set at the maximum wireless transmit power level Pmax.

In addition, if the present remaining battery life B the power level deciding unit 11f acquires from the charger 22 of the wireless set 20 via the connection for charging is less than a prescribed threshold Y, the value obtained by adding X2 (<X1) dB less than the foregoing X1 dB to the noise level N is used as the transmit power level P (=X2+N).

The information indicating the power level determined as described above is sent from the power level deciding unit 11f to the wireless set charging processor 12 or wireless set authentication processor 13.

The wireless set charging processor 12 or wireless set authentication processor 13 serving as the in-vehicle informing processor transmits the information indicating the transmit power level P to the charger 22 or authentication processor 23 of the wireless set 20 via the connection for charging or connection for authentication. The information indicating the transmit power level P is supplied from the charger 22 or authentication processor 23 to the wireless communication apparatus 21. As shown in FIG. 10, the wireless communication apparatus 21 controls and attenuates the transmit power in a manner making the transmit power level of the transmission signal equal to the transmit power level P.

After that, even when the wireless communication is established and the communication is started between the first wireless communication unit 11a and the wireless set 20, the wireless set 20 can continue the wireless communication at the transmit power level P that does not have a bad effect on the wireless communication between the second wireless communication unit 11b and the wireless set 20A by Bluetooth.

Incidentally, it is also possible to control and raise the transmit power of the transmission signal within the range that enables preventing the excessive received power level of the second wireless communication unit 11b.

In addition, even after the wireless communication has been started, since the noise level N of the use frequency band of the wireless LAN fluctuates, the noise level measuring unit 11e can send the noise level N to the power level deciding unit 11f at the point of time when the noise level N which is measured periodically or continuously varies. This enables the power level deciding unit 11f to determine the transmit power level P in accordance with the fluctuations in the noise level N, and to adjust the transmit power of the wireless set 20 to the transmit power level P.

In addition, since the remaining battery life B of the wireless set 20 varies, the charger 22 of the wireless set 20, when the remaining battery life B it measures periodically becomes less than the prescribed threshold Y, can notify the onboard wireless communication apparatus 10 of that effect. This enables the power level deciding unit 11f to determine the transmit power level P in accordance with the remaining battery life B of the wireless set 20, and to adjust the transmit power of the wireless set 20 to the transmit power level P.

As described above, according to the present embodiment 2, it comprises the communication activity deciding unit 11d that decides, when the first wireless communication unit 11a is about to carry out the wireless communication with the wireless set 20 serving as a communication partner, on whether the second wireless communication unit 11b other than the first wireless communication unit 11a is carrying out wireless communication with the second wireless set 20A or not, wherein when the communication activity deciding unit 11d decides that the second wireless communication unit 11b is carrying out the wireless communication, the in-vehicle informing processor instructs the wireless set 20 serving as a communication partner to control the transmit power, and when the communication activity deciding unit 11d decides that it is not carrying out the wireless communication, the in-vehicle informing processor instructs the wireless set 20 serving as a communication partner not to control the transmit power. In this way, the present embodiment 2 can control the transmit power of the wireless set 20 appropriately in the communication state that is likely to affect the wireless communication of the wireless set 20A. In addition, unless the wireless set 20A is carrying out the wireless communication, the wireless set 20 can carry out the wireless communication at the original transmit power.

In addition, according to the present embodiment 2, it comprises the power level deciding unit 11f that determines the transmit power level that enables avoiding the excessive received power level of the second wireless communication unit 11b according to the radio environment of the use frequency band of the first wireless communication unit 11a, wherein the in-vehicle informing processor notifies the wireless set 20 of the transmit power level the power level deciding unit 11f determines.

This makes is possible to adjust the transmit power of the wireless set 20 to the appropriate transmit power level P the onboard wireless communication apparatus 10 side determines.

Embodiment 3

A wireless set of an embodiment 3 has a means for deciding on whether it is located inside the vehicle or not, and when it decides that it is located inside the vehicle, it controls the transmit power in such a manner as to avoid the excessive received power level of the wireless communication unit of the onboard wireless communication apparatus.

Figure 11:
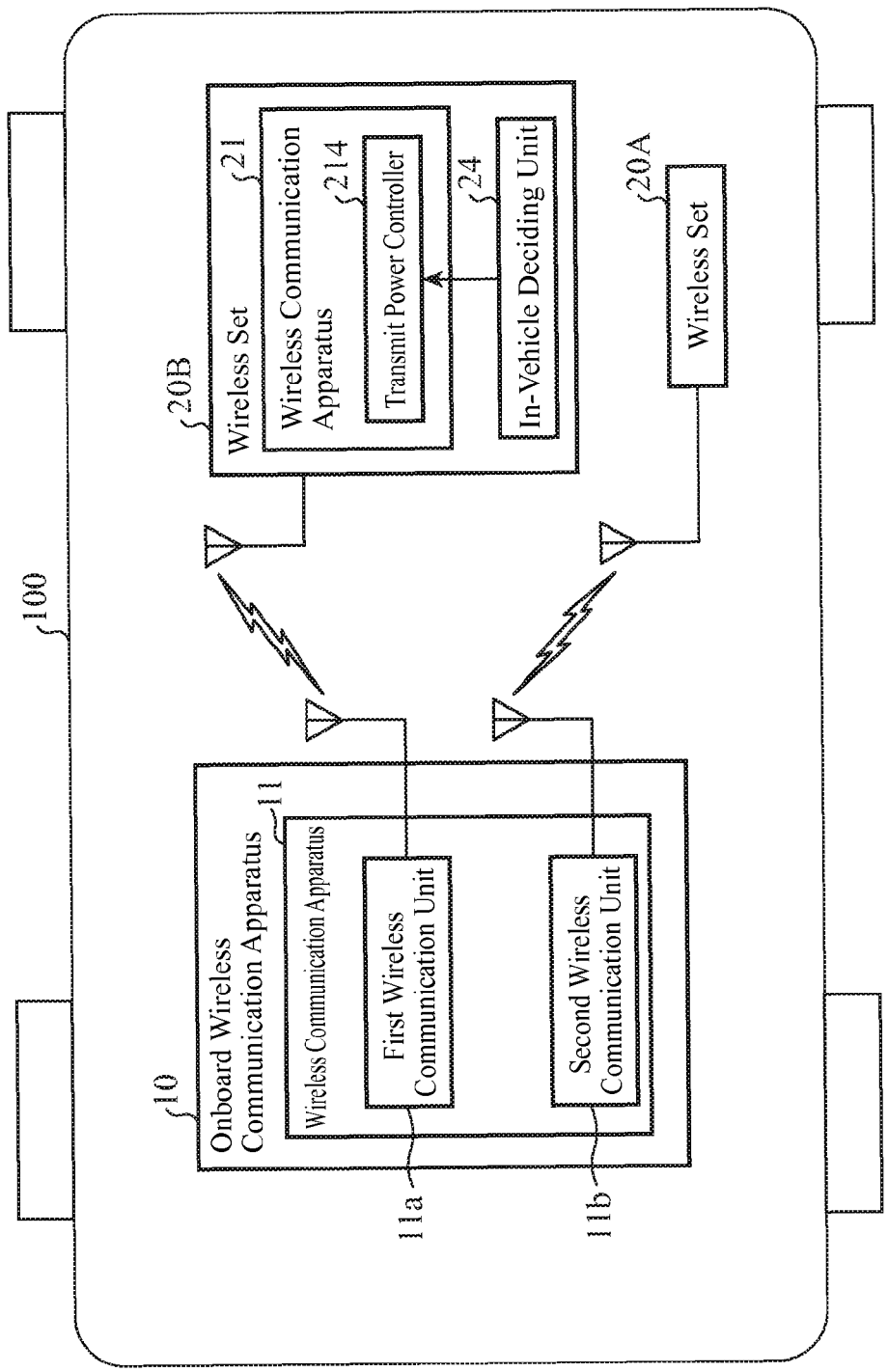
FIG. 11 is a schematic diagram showing a communication connection mode between an onboard wireless communication apparatus and a wireless set of an embodiment 3 in accordance with the present invention.

FIG. 11 is a schematic diagram showing a mode of communication connection between the onboard wireless communication apparatus and the wireless set of the embodiment 3 in accordance with the present invention. In FIG. 11, the first wireless communication unit 11a in the wireless communication apparatus 11 of the onboard wireless communication apparatus 10 is about to carry out wireless communication with a wireless set 20B via a wireless LAN. It is assumed in this case that the second wireless communication unit 11b is carrying out wireless communication with the wireless set 20A by Bluetooth. The wireless set 20B is comprised of a wireless communication apparatus 21 and an in-vehicle deciding unit 24. The in-vehicle deciding unit 24 executes the processing of deciding on whether the wireless set 20B is located inside the vehicle 100 or not. Incidentally, just as in FIG. 1, the wireless set 20B can comprise a charger 22 and an authentication processor 23.

In addition, although FIG. 11 shows a case where the first wireless communication unit 11a and the second wireless communication unit 11b use separate antennas, the antennas can be unified by connecting the terminals of a single antenna to the first wireless communication unit 11a and second wireless communication unit 11b via a distributor.

Furthermore, although FIG. 11 shows a case where the first wireless communication unit 11a and the second wireless communication unit 11b are both installed in the wireless communication apparatus 11 of the onboard wireless communication apparatus 10, the second wireless communication unit 11b can be installed in a wireless communication apparatus other than the wireless communication apparatus 11 of the onboard wireless communication apparatus 10.

If the in-vehicle deciding unit 24 decides that the wireless set 20B is located inside the vehicle 100, it sends the decision result to the transmit power controller 214 of the wireless communication apparatus 21. The transmit power controller 214, receiving the information that the wireless set 20B is located inside the vehicle 100 from the in-vehicle deciding unit 24, switches on, and controls and attenuates the transmit power of the transmission signal so as to prevent the excessive received power level of the second wireless communication unit 11b.

Incidentally, it is also possible to control and raise the transmit power of the transmission signal within the range that enables avoiding the excessive received power level of the second wireless communication unit 11b.

With such a configuration, the present embodiment 3 can control the transmit power of the wireless set 20B, and hence is able to improve the communication quality by reducing the deterioration of the receiving performance in the existing other wireless communication (the wireless communication of the wireless set 20A).

Figure 12:
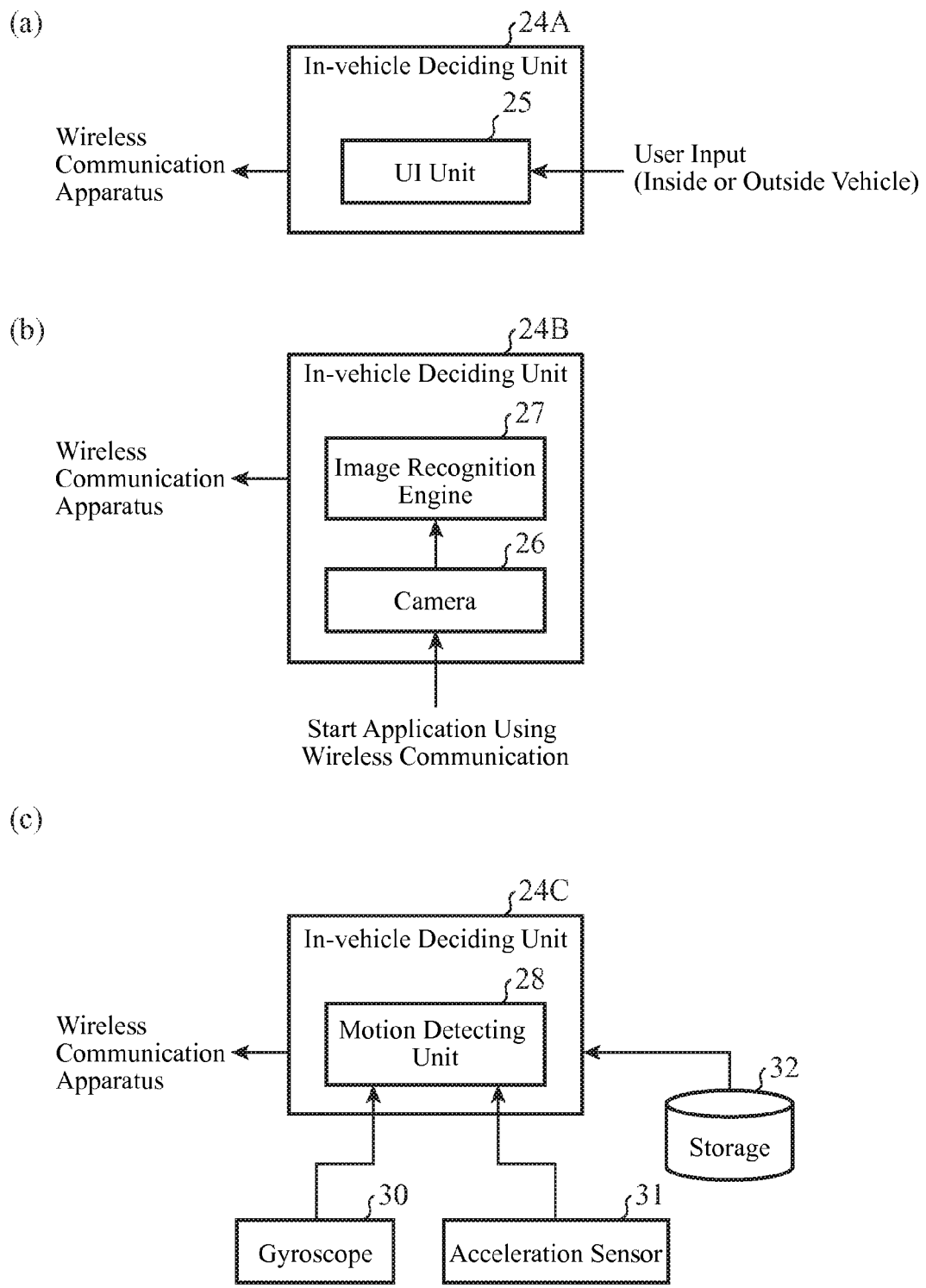
FIG. 12 is a diagram showing configurations of in-vehicle deciding units in the wireless set of the embodiment 3.

FIG. 12 is a diagram showing a configuration of the in-vehicle deciding unit in a wireless set of the embodiment 3, which shows the in-vehicle deciding unit with various configurations.

The in-vehicle deciding unit 24A shown in FIG. 12(a) comprises a UI unit 25. The UI unit 25 receives information indicating whether the wireless set is located inside the vehicle 100 or not from its user when the wireless set 20B is about to carry out wireless communication with the onboard wireless communication apparatus 10. For example, the UI unit 25 is offered as one of the applications which use the wireless communication and are executed by the wireless set 20B. The UI unit 25 displays a menu for selecting on whether the wireless set 20B is located inside or outside the vehicle on the display of the wireless set 20B, and receives the information indicating whether it is inside the vehicle 100 or not from the user.

The in-vehicle deciding unit 24A decides on whether the wireless set 20B is located inside the vehicle 100 or not from the information the UI unit 25 receives. The transmit power controller 214 is turned on when receiving the user input information indicating that the wireless set 20B is located inside the vehicle 100 from the in-vehicle deciding unit 24A, and controls and attenuates the transmit power of the transmission signal so as to avoid the excessive received power level of the second wireless communication unit 11b.

Incidentally, it is also possible to carry out control of raising the transmit power of the transmission signal within the range that enables avoiding the excessive received power level of the second wireless communication unit 11b.

With such a configuration, the present embodiment 3 can control the transmit power of the wireless set 20B, thereby being able to improve the communication quality by reducing the deterioration of the receiving performance of the existing other wireless communication (the wireless communication of the wireless set 20A).

The in-vehicle deciding unit 24B shown in FIG. 12(b) comprises a camera 26 and an image recognition engine 27. The camera 26, which is provided in the wireless set 20B, is started simultaneously as an application using the wireless communication in the wireless set 20B is started, and takes an image of the surroundings of the wireless set 20B. The image recognition engine 27 executes the image recognition of a state inside the vehicle 100 from the image taken with the camera 26. As a state inside the vehicle 100, there is a state in which devices or instruments inside the vehicle 100 such as the steering wheel, the parking brake and a meter are taken.

When the image recognition engine 27 performs the image recognition of the state inside the vehicle 100, the in-vehicle deciding unit 24B decides that the wireless set 20B is located inside the vehicle 100.

Receiving the information that the wireless set 20B is located inside the vehicle 100 from the in-vehicle deciding unit 24B, the transmit power controller 214 is turned on, and controls and attenuates the transmit power of the transmission signal so as to avoid the excessive received power level of the second wireless communication unit 11b.

Incidentally, it is also possible to carry out control of raising the transmit power of the transmission signal within the range that enables avoiding the excessive received power level of the second wireless communication unit 11b.

With such a configuration, the present embodiment 3 can also control the transmit power of the wireless set 20B, thereby being able to improve the communication quality by reducing the deterioration of the receiving performance of the existing other wireless communication (the wireless communication of the wireless set 20A).

The in-vehicle deciding unit 24C shown in FIG. 12(c) comprises a motion detecting unit 28. In addition, the motion detecting unit 28 is connected to a gyroscope 30, an acceleration sensor 31 and a storage 32. The gyroscope 30 detects the angular speed corresponding to the movement of a user carrying the wireless set 20B. In addition, the acceleration sensor 31 detects the acceleration corresponding to the movement of the user carrying the wireless set 20B. The storage 32 stores motion information on typical movements when a user gets into the vehicle 100. For example, the acceleration and angular speed occurring in the wireless set 20B because of an up-and-down movement of a user when getting into the vehicle after opening and shutting a door, a motionless state until starting the engine of the vehicle 100, the acceleration at the start of the vehicle, vibrations from the engine after the start and the like constitute the motion information.

The motion detecting unit 28 detects the motion information about the movement of the user carrying the wireless set 20B from the detection results of the gyroscope 30 and acceleration sensor 31.

The in-vehicle deciding unit 24C decides on whether the movement of the user is that when the user gets into the vehicle 100 or not by comparing the motion information the motion detecting unit 28 detects with the motion information stored in the storage 32.

Receiving the information that the wireless set 20B is located inside the vehicle 100 from the in-vehicle deciding unit 24C, the transmit power controller 214 is turned on, and controls and attenuates the transmit power of the transmission signal so as to avoid the excessive received power level of the second wireless communication unit 11b.

Incidentally, it is also possible to carry out control of raising the transmit power of the transmission signal within the range that enables avoiding the excessive received power level of the second wireless communication unit 11b.

With such a configuration, the present embodiment 3 can control the transmit power of the wireless set 20B, thereby being able to improve the communication quality by reducing the deterioration of the receiving performance of the existing other wireless communication (the wireless communication of the wireless set 20A).

Incidentally, although the foregoing description shows the examples in which the UI unit 25, the camera 26 and image recognition engine 27, and the motion detecting unit 28 are used to decide on whether the wireless set 20B is located inside the vehicle 100 or not, other configurations are possible as long as they can decide on whether the wireless set 20B is located inside the vehicle 100 or not. For example, the in-vehicle deciding unit 24 can acquire information indicating whether the wireless set 20B is located inside the vehicle 100 or not from an external apparatus other than the onboard wireless communication apparatus 10 to make the decision.

As described above, according to the present embodiment 3, the wireless set 20B comprises the in-vehicle deciding unit 24 that decides on whether the wireless set 20B itself is located inside the vehicle 100 or not, and the transmit power controller 214 that controls, when the in-vehicle deciding unit 24 decides that the wireless set 20B is located inside the vehicle 100, and if the wireless set 20B is about to carry out wireless communication with the first wireless communication unit 11a, the transmit power in such a manner as to prevent the excessive received power level of the second wireless communication unit 11b, thereby being able to control the transmit power of the wireless set 20B. Accordingly, the present embodiment 3 can improve the communication quality by reducing the deterioration of the receiving performance in the existing other wireless communication.

In addition, according to the present embodiment 3, the in-vehicle deciding unit 24A comprises the UI unit 25 that receives from a user the information indicating whether the user's wireless set is located inside the vehicle 100 or not at the time when it is about to carry out wireless communication with the onboard wireless communication apparatus 10, and decides on whether the wireless set 20B is located inside the vehicle 100 or not from the information the UI unit 25 receives. Accordingly, the present embodiment 3 can control the transmit power of the wireless set 20B, thereby being able to improve the communication quality by reducing the deterioration of the receiving performance in the existing other wireless communication.

Furthermore, according to the present embodiment 3, the in-vehicle deciding unit 24B comprises the camera 26 that takes its surroundings at the time when the wireless set 20B is about to carry out wireless communication with the onboard wireless communication apparatus 10, and the image recognition engine 27 that performs image recognition of the state inside the vehicle 100 from an image the camera 26 has taken. Thus, the wireless set 20B decides on whether it is located inside the vehicle 100 or not according to whether the image recognition engine 27 performs the image recognition of the state inside the vehicle 100 or not. Accordingly, the wireless set 20B can control its transmit power, thereby being able to improve the communication quality by reducing the deterioration of the receiving performance of the existing other wireless communication.

Furthermore, according to the present embodiment 3, the in-vehicle deciding unit 24C comprises the motion detecting unit 28 that detects the motion information indicating the movement of a user carrying the wireless set 20B, and decides on whether the wireless set 20B is located inside the vehicle 100 or not from whether the motion information the motion detecting unit 28 detects matches the user movement inside the vehicle 100 or not. Thus, the wireless set 20B can control its transmit power, thereby being able to improve the communication quality by reducing the deterioration of the receiving performance of the existing other wireless communication.

Incidentally, it is to be understood that a free combination of the individual embodiments, variations of any components of the individual embodiments or removal of any components of the individual embodiments is possible within the scope of the present invention.

INDUSTRIAL APPLICABILITY

Since an onboard wireless communication apparatus in accordance with the present invention can improve the communication quality by reducing the deterioration of the receiving performance due to the excessive received power level within the in-vehicle space, it is suitable for a wireless communication apparatus of an onboard information apparatus adopting various wireless techniques.

DESCRIPTION OF REFERENCE SYMBOLS 10 onboard wireless communication apparatus; 11, 21 wireless communication apparatus; 11a first wireless communication unit; lib second wireless communication unit; 11c controller; 11d communication activity deciding unit; 11e noise level measuring unit; 11f power level deciding unit; 12 wireless set charging processor; 13 wireless set authentication processor; 20, 20A, 20B wireless set; 22 charger; 23 authentication processor; 24, 24A-24C in-vehicle deciding unit; 25 UI unit; 26 camera; 27 image recognition engine; 28 motion detecting unit; 30 gyroscope; 31 acceleration sensor; 32 storage.

What is claimed is:

1. An onboard wireless communication apparatus which is installed inside a vehicle and includes a first wireless communication apparatus that carries out wireless communication, the onboard wireless communication apparatus comprising:
   an in-vehicle informing processor that sends information that enables a wireless set to recognize that the wireless set is located inside the vehicle to the wireless set, wherein
   when the wireless set recognizes that it is located inside the vehicle, the wireless set prepares for carrying out wireless communication with the first wireless communication apparatus by controlling a transmit power of the wireless set in a manner avoiding an excessive receiving power level of a second communication apparatus that is carrying out, besides the first wireless communication apparatus, wireless communication inside the vehicle by a wireless communication technique using the same frequency band as the first wireless communication apparatus,
   the in-vehicle informing processor is the first wireless communication apparatus; and
   the information that enables the wireless set to recognize that the wireless set is located inside the vehicle is information about a communication connection ID which is sent from the first wireless communication apparatus to the wireless set to establish wireless communication with the wireless set and which is formed by incorporating information about the vehicle the wireless set can recognize into the communication connection ID.

2. The onboard wireless communication apparatus according to claim 1, further comprising:
   a controller that decides, when the first wireless communication apparatus prepares to carry out wireless communication with the wireless set, on whether the second wireless communication apparatus other than the first wireless communication apparatus is carrying out wireless communication inside the vehicle or not, wherein the in-vehicle informing processor:
   instructs, when the controller decides that the wireless communication is being carried out, the wireless set serving as the communication partner to control its transmit power; and
   instructs, when the controller does not decide that the wireless communication is being carried out, the wireless set serving as the communication partner not to control the transmit power.

3. The onboard wireless communication apparatus according to claim 2,
   wherein the controller decides a transmit power level that enables avoiding an excessive received power level of the second wireless communication apparatus according to a radio environment of the frequency band the first wireless communication apparatus uses, the second wireless communication apparatus carrying out wireless communication besides the first wireless communication apparatus, and
   wherein the in-vehicle informing processor sends the transmit power level the controller decides to the wireless set serving as a communication partner.

4. An onboard wireless communication apparatus which is installed inside a vehicle and includes a first wireless communication apparatus that carries out wireless communication, the onboard wireless communication apparatus comprising:
   an in-vehicle informing processor that sends information that enables a wireless set to recognize that the wireless set is located inside the vehicle to the wireless set, wherein
   when the wireless set recognizes that it is located inside the vehicle, the wireless set prepares for carrying out wireless communication with the first wireless communication apparatus by controlling a transmit power of the wireless set in a manner avoiding an excessive receiving power level of a second communication apparatus that is carrying out, besides the first wireless communication apparatus, wireless communication inside the vehicle by a wireless communication technique using the same frequency band as the first wireless communication apparatus, wherein
   the in-vehicle informing processor is a charging processor that transmits charging power to the wireless set; and
   the information that enables the wireless set to recognize that the wireless set is located inside the vehicle is information which is fowled by incorporating information about the vehicle the wireless set can recognize into information the charging processor sends to the wireless set to transmit the charging power to the wireless set.

5. An onboard wireless communication apparatus which is installed inside a vehicle and includes a first wireless communication apparatus that carries out wireless communication, the onboard wireless communication apparatus comprising:
   an in-vehicle informing processor that sends information that enables a wireless set to recognize that the wireless set is located inside the vehicle to the wireless set, wherein
   when the wireless set recognizes that it is located inside the vehicle, the wireless set prepares for carrying out wireless communication with the first wireless communication apparatus by controlling a transmit power of the wireless set in a manner avoiding an excessive receiving power level of a second communication apparatus that is carrying out, besides the first wireless communication apparatus, wireless communication inside the vehicle by a wireless communication technique using the same frequency band as the first wireless communication apparatus, the in-vehicle informing processor is an authentication processor that executes authentication processing of the wireless set; and the information that enables the wireless set to recognize that the wireless set is located inside the vehicle is information which is formed by incorporating information about the vehicle the wireless set can recognize into information the authentication processor sends to the wireless set to authenticate the wireless set.

6. A wireless set that carries out wireless communication with a first wireless communication apparatus included in an onboard wireless communication apparatus installed inside a vehicle, the wireless set comprising:

a recognizer that recognizes that the wireless set is located inside the vehicle from information sent from the onboard wireless communication apparatus; and a transmit power controller that controls, when the recognizer recognizes that the wireless set is located inside the vehicle, transmit power of the wireless set in a manner that enables avoiding an excessive received power level of a second wireless communication apparatus which is carrying out in-vehicle wireless communication besides the first wireless communication apparatus serving as a communication partner, and which employs a wireless communication technique using the same frequency band as the first wireless communication apparatus, wherein the information from which the recognizer recognizes that the wireless set is located inside the vehicle is information about a communication connection ID which is sent from the first wireless communication apparatus to the wireless set to establish wireless communication with the wireless set and which is formed by incorporating information about the vehicle the wireless set can recognize into the communication connection ID.

7. A wireless set that carries out wireless communication with a first wireless communication apparatus included in an onboard wireless communication apparatus installed inside a vehicle, the wireless set comprising:

an in-vehicle deciding unit that decides on whether the wireless set is located inside the vehicle or not; and a transmit power controller that attenuates, when the in-vehicle deciding unit decides that the wireless set is located inside the vehicle, transmit power to a non-zero level that enables avoiding an excessive received power level of a second wireless communication apparatus which is carrying out in-vehicle wireless communication besides the first wireless communication apparatus serving as a communication partner, and which employs a wireless communication technique using the same frequency band as the first wireless communication apparatus, wherein the information from which the in-vehicle deciding unit recognizes that the wireless set is located inside the vehicle is information about a communication connection ID which is sent from the first wireless communication apparatus to the wireless set to establish wireless communication with the wireless set and which is formed by incorporating information about the vehicle the wireless set can recognize into the communication connection ID.

8. The wireless set according to claim 7, wherein the in-vehicle deciding unit:

comprises a user interface that receives information indicating whether the wireless set is located inside the vehicle or not from a user when the wireless set prepares to carry out wireless communication with the onboard wireless communication apparatus; and decides from the information the user interface receives on whether the wireless set is located inside the vehicle or not.

9. The wireless set according to claim 7, wherein the in-vehicle deciding unit:

comprises a camera that takes a surrounding image when the wireless set is preparing to carry out wireless communication with the onboard wireless communication apparatus;

comprises an image recognition engine that carries out image recognition of an in-vehicle state from the image the camera takes; and decides on whether the wireless set is located inside the vehicle or not according to whether the image recognition engine carries out image recognition of the in-vehicle state or not.

10. The wireless set according to claim 7, wherein the in-vehicle deciding unit:

comprises a motion detector that detects motion information indicating movement of a user carrying the wireless set; and decides on whether the wireless set is located inside the vehicle or not from whether the motion information the motion detector detects matches to a movement of the user inside the vehicle.

* * * * *